United States Patent
Ando

(10) Patent No.: US 9,374,490 B2
(45) Date of Patent: Jun. 21, 2016

(54) INFORMATION PROCESSING SYSTEM, EQUIPMENT UNIT, AND INFORMATION PROCESSING METHOD

(71) Applicant: Mitsuo Ando, Fukuoka (JP)

(72) Inventor: Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/656,047

(22) Filed: Mar. 12, 2015

(65) Prior Publication Data

US 2015/0264200 A1 Sep. 17, 2015

(30) Foreign Application Priority Data

Mar. 14, 2014 (JP) .................................. 2014-051848

(51) Int. Cl.

| | |
|---|---|
| *G06F 3/12* | (2006.01) |
| *H04N 1/00* | (2006.01) |
| *H04N 1/32* | (2006.01) |
| *H04L 29/08* | (2006.01) |
| *G06Q 10/06* | (2012.01) |
| *G06Q 10/10* | (2012.01) |

(52) U.S. Cl.
CPC ............. *H04N 1/0097* (2013.01); *G06Q 10/06* (2013.01); *G06Q 10/10* (2013.01); *H04L 67/22* (2013.01); *H04N 1/00204* (2013.01); *H04N 1/00408* (2013.01); *H04N 1/00973* (2013.01); *H04N 1/32411* (2013.01); *H04L 67/306* (2013.01); *H04N 2201/0094* (2013.01); *H04N 2201/3204* (2013.01); *H04N 2201/3274* (2013.01); *H04N 2201/3278* (2013.01)

(58) Field of Classification Search
USPC ........ 358/1.18, 401, 404, 403, 407, 438, 448, 358/1.15, 1.16
See application file for complete search history.

(56) References Cited

U.S. PATENT DOCUMENTS

| | | | | |
|---|---|---|---|---|
| 2012/0044533 | A1* | 2/2012 | Inoue | .................. H04N 1/0022 358/1.15 |
| 2013/0073719 | A1 | 3/2013 | Ando | |
| 2013/0242331 | A1 | 9/2013 | Ando | |
| 2014/0016165 | A1 | 1/2014 | Ando | |
| 2014/0146363 | A1 | 5/2014 | Hirokawa et al. | |

FOREIGN PATENT DOCUMENTS

| | | | | |
|---|---|---|---|---|
| JP | 404299773 | * | 10/1992 | .............. G06F 15/40 |
| JP | 2000071581 | * | 3/2000 | .............. B41J 29/46 |
| JP | 2003186639 | * | 7/2003 | ................ G06F 3/12 |
| JP | 2014-032659 | | 2/2014 | |
| JP | 2014-112361 | | 6/2014 | |
| WO | WO 2014/073499 A1 | | 5/2014 | |

* cited by examiner

*Primary Examiner* — Jerome Grant, II

(74) *Attorney, Agent, or Firm* — Oblon, McClelland, Maier & Neustadt, L.L.P.

(57) ABSTRACT

An information processing system including at least one computer that is connected to an equipment unit via a network is disclosed. The information processing system includes a reception unit which receives data via the network; a data storage unit which stores the data; a first transmission unit which transmits, to the equipment unit, the data in response to a request for obtaining the data stored in the data storage unit from some equipment unit; a history information storage unit which stores history information on transmission of the data by the first transmission unit and on reception of the data by the reception unit; a projection unit which projects a first equipment unit which transmits the obtaining request on first data in response to the reception of the first data by the reception unit; and a second transmission unit which transmits information on the first data to the first equipment unit.

11 Claims, 24 Drawing Sheets

FIG.11

| TENANT ID | NAME | USER ID | PASSWORD | CARD ID | AFFILIATED DEPARTMENT NAME | PRIVILEGE |
|---|---|---|---|---|---|---|
| 0001 | TARO COHRI | Taro | 123 | CID111 | ... | ADMINISTRATOR |
| | YOKO COHRI | Yoko | 777 | CID222 | ... | GENERAL |
| 0002 | .. | .. | .. | .. | .. | .. |

| USER ID | DESTINATION ID | TELEPHONE NUMBER | MAIL ADDRESS |
|---|---|---|---|
| Taro | Yoko | 03-xxx-xxx | Yoko@rrr.com |
| | xxx | ... | ... |
| Yoko | Taro | 092-xxx-xxx | Taro@rrr.com |
| | xxx | ... | ... |
| | ACCOUNTING | | |
| | DEVELOPMENT | | |

| DOCUMENT ID | TYPE | URI | SIZE | DATE/TIME | CREATOR | FORMAT | DESTINATION |
|---|---|---|---|---|---|---|---|
| Doc9 | REPORT | rrr.com/report.pdf | 1 MB | 2/6 12:01 | Yoko | Pdf | Taro |
| Doc8 | VOUCHER | rrr.com/voucher.doc | 2 MB | 2/6 11:50 | Yoko | Doc | WITHIN DEPARTMENT |

| USER ID | APPLICATION ID | PRIORITY SETTING |
|---|---|---|
| Taro | PullPrint | PRIORITY |
| Taro | Portal | |
| Yoko | Portal | PRIORITY |

| APPLICATION ID | APPLICATION NAME | TYPE | URI | INSTALLATION METHOD | FUNCTION | TENANT ID |
|---|---|---|---|---|---|---|
| PullPrint | CLOUD PULL PRINT | Web APPLICATION | rrr.com/cpp | ON DEMAND | Print | 0001 |
| Portal | DEVICE PORTAL | NATIVE APPLICATION | rrr.com/dp | ADVANCED | — | 0001, 0002 |

| HISTORY NUMBER | DATE/TIME | LOCATION | USER ID | DOCUMENT ID | APPLI-CATION ID | JOB ID | EQUIPMENT ID | EVENT CONTENT | ... |
|---|---|---|---|---|---|---|---|---|---|
| LID261200 | 2/6 12:00 | TOKYO | Yoko | | | — | PC1 | AUTHEN-TICATION | ... |
| LID261201 | 2/6 12:01 | TOKYO | Yoko | Doc9 | Upload | JID261201 | PC1 | UPLOAD | ... |
| LID261210 | 2/6 12:10 | FUKUOKA | — | | | — | LP1 | HUMAN DETECTION | ... |
| LID261211 | 2/6 12:11 | FUKUOKA | — | | | — | LP1 | RETURN TO ENERGY SAVING | ... |
| LID261212 | 2/6 12:12 | FUKUOKA | — | | | — | LP1 | READ SMART CARD | ... |
| LID261213 | 2/6 12:13 | FUKUOKA | Taro | | | — | LP1 | AUTHEN-TICATION | ... |
| LID261214 | 2/6 12:14 | FUKUOKA | Taro | | | — | LP1 | ACTIVATE BROWSER | ... |
| LID261215 | 2/6 12:15 | FUKUOKA | Taro | | PullPrint | — | LP1 | TRANSMIT PullPrint | ... |
| LID261216 | 2/6 12:16 | FUKUOKA | Taro | | PullPrint | — | LP1 | TRANSMIT DOCUMENT LIST | ... |
| LID261217 | 2/6 12:17 | FUKUOKA | Taro | | PullPrint | — | LP1 | DISPLAY DOCUMENT LIST | ... |
| LID261218 | 2/6 12:18 | FUKUOKA | Taro | Doc9 | PullPrint | JID261218 | LP1 | TRANSMIT PRINT DATA | ... |
| LID261219 | 2/6 12:19 | FUKUOKA | Taro | Doc9 | Pp | JID261218 | LP1 | PRINT | ... |
| LID261220 | 2/6 12:20 | FUKUOKA | Taro | Doc9 | Pp | JID261218 | LP1 | DELETE DOCUMENT | ... |

FIG.19

| TENANT ID | EQUIPMENT ID | EQUIPMENT NAME | EQUIPMENT TYPE | FUNCTION | INSTALLATION LOCATION |
|---|---|---|---|---|---|
| 0001 | MFP | AAA | A3 COLOR MACHINE | Copy/Scan/Print/Fax | TOKYO |
|  | LP1 | BBB | A4 COLOR MACHINE | Print | FUKUOKA |
| 0002 | .. | .. | .. | .. | .. |

| DOCUMENT ID | UPLOAD INFORMATION |  |  |  |  | DOWNLOAD INFORMATION |  |  |  |
|---|---|---|---|---|---|---|---|---|---|
|  | DOCUMENT TYPE | DATE/ TIME | From | To | DELAY | USER ID | LOCATION | EQUIPMENT ID | APPLI- CATION ID |
| Doc9 | REPORT | 2/6 12:01 | Yoko | Taro | 0:17 | Taro | FUKUOKA | LP1 | PullPrint |
| Doc8 | REPORT | 2/6 11:50 | Yoko | MFP1 | 0:03 | Yoko | TOKYO | MFP1 | PrintApps |
| Doc7 | REPORT | 2/6 11:40 | Yoko | Yoko |  |  |  |  |  |
| Doc6 | REPORT | 2/6 11:30 | Yoko | Taro | 0:15 | Taro | FUKUOKA | LP1 | PullPrint |
| Doc5 | REPORT | 2/6 11:20 | Yoko | Taro | 0:10 | Taro | FUKUOKA | LP1 | PullPrint |
|  |  |  |  | DEVEL- OPMENT | 0:15 | xxx | FUKUOKA | LP1 | PullPrint |
| Doc4 | REPORT | 2/6 11:10 | Yoko |  | 0:20 | Taro | FUKUOKA | LP1 | PullPrint |

FIG.23

| | PERSON HIMSELF | SPECIFIC HUMAN | | REPORT ACCOUNTING | SHARE DEVELOPMENT | |
|---|---|---|---|---|---|---|
| | MFP1 | PERSON HIMSELF | Taro | xxx | | Taro | xxx |
| NO. OF UPLOADS | 1 | 1 | 3 | 3 | 0 | 1 | 1 |
| NO. OF DOWNLOADS | 1 | 0 | 2 | 2 | 0 | 1 | 1 |
| OUTPUT RATIO | 100% | 0% | 67% | 67% | — | 100% | 100% |

|  | PC1 | MFP1 | LP1 |
|---|---|---|---|
| Yoko | 0% | 100% | 0% |
| Taro | 0% | 0% | 100% |
| xxx | 0% | 0% | 100% |

FIG.26

| APPLICATION ID | DOWNLOAD SCRIPT TEMPLATE |
|---|---|
| PullPrint | ForIn(Document:<USER ID>) |
| Portal | In(Document:<USER ID>) |

237

INFORMATION PROCESSING SYSTEM, EQUIPMENT UNIT, AND INFORMATION PROCESSING METHOD

TECHNICAL FIELD

The present invention relates to information processing systems, equipment units, and information processing methods.

BACKGROUND ART

Equipment units installed in offices that include image forming apparatuses, etc., include a large number of units shared by multiple users. In such equipment units, if a screen including individual information for each user (below called "individual information") is displayed according to a user login, the number of operational steps needed until a process on the individual information of the user is caused to be executed is reduced.

When the individual information is stored in a storage apparatus such as a cloud storage that is connected to an equipment unit via a network, the operability of the equipment unit is greatly influenced by the responsiveness of network communications. For example, display time of the screen may be prolonged, possibly giving stress to the user

DISCLOSURE OF THE INVENTION

According to an embodiment of the present invention is provided an information processing system including at least one computer that is connected to an equipment unit via a network, comprising: a reception unit which receives data via the network; a data storage unit which stores the data; a first transmission unit which transmits, to the equipment unit, the data in response to a request for obtaining the data stored in the data storage unit from some equipment unit; a history information storage unit which stores history information on transmission of the data by the first transmission unit and on reception of the data by the reception unit; a projection unit which projects a first equipment unit which transmits the obtaining request on first data in response to the reception of the first data by the reception unit; and a second transmission unit which transmits information on the first data to the first equipment unit.

BRIEF DESCRIPTION OF THE DRAWINGS

Other objects, features, and advantages of the present invention will become more apparent from the following detailed descriptions when read in conjunction with the accompanying drawings, in which:

FIG. 11 is a diagram illustrating an exemplary configuration of a user information storage unit;

FIG. 12 is a diagram illustrating an exemplary configuration of an address book storage unit;

FIG. 13 is a diagram illustrating an exemplary configuration of a document information storage unit;

FIG. 14 is a diagram illustrating an exemplary configuration of a bookmark storage unit;

FIG. 15 is a diagram illustrating an exemplary configuration of an application information storage unit;

FIG. 18 is a diagram illustrating an exemplary configuration of a historical information storage unit;

FIG. 19 is a diagram illustrating an exemplary configuration of an equipment information storage unit;

FIG. 20 is a diagram illustrating exemplary extraction of delivery information on a document from historical information;

FIG. 23 is a diagram illustrating an exemplary configuration of a distribution classification table;

FIG. 26 is a diagram illustrating an exemplary configuration of a script template storage unit;

BEST MODE FOR CARRYING OUT THE INVENTION

Below, an embodiment of the present invention is explained based on the drawings.

Figure 1:
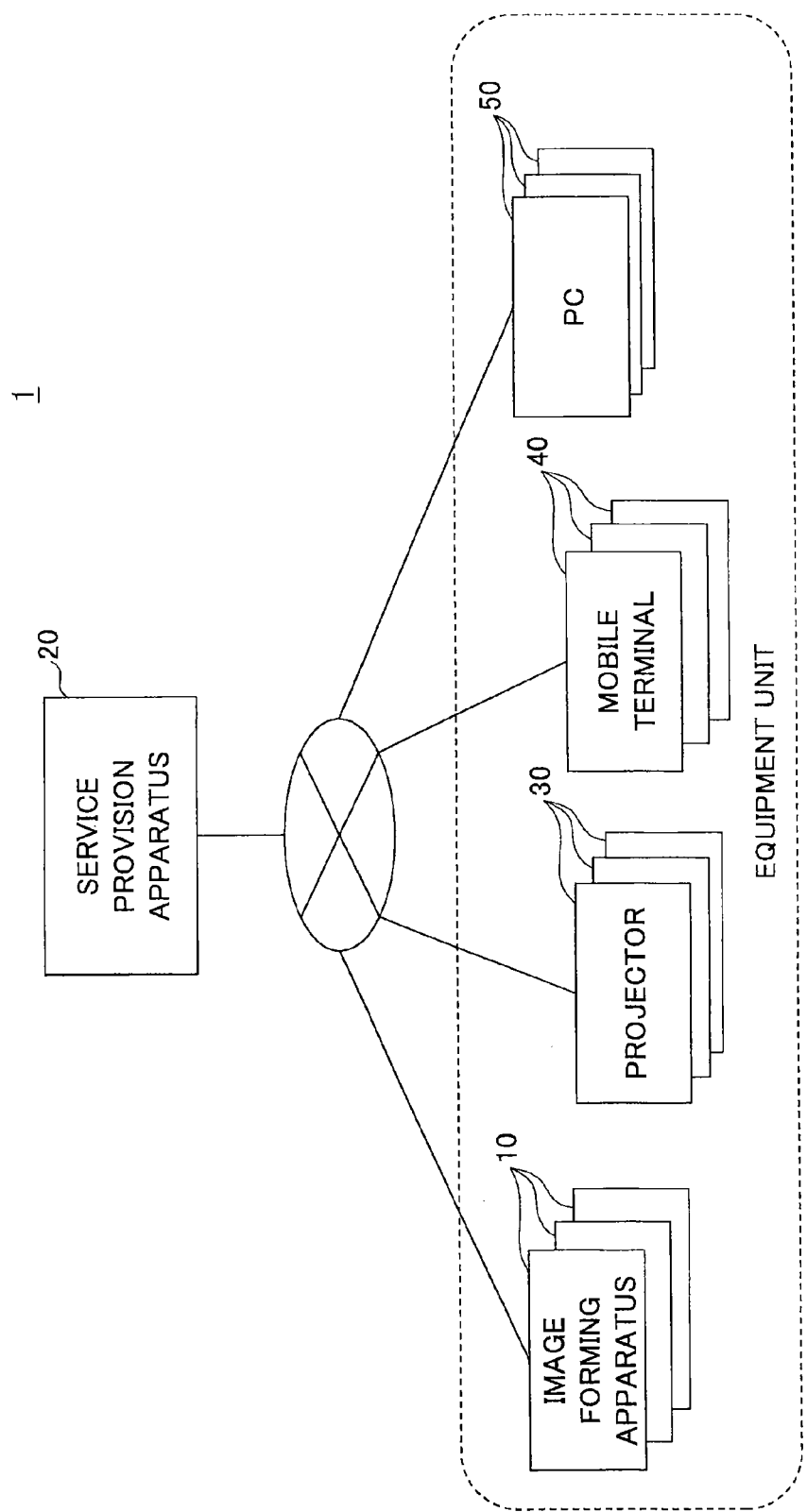
FIG. 1 is a diagram showing an exemplary configuration of an information processing system in an embodiment of the present invention.

FIG. 1 shows an image forming apparatus 10, a projector 30, a mobile terminal 40, a PC 50, etc., as one example of various equipment units. The image forming apparatus 10 includes a scanner, a printer, a multifunctional peripheral, etc. The projector 30 is an apparatus which projects an image of a document, etc. The mobile terminal 40 is a smartphone, a tablet terminal, etc. These various equipment units function as data input sources or data output destinations for a service provided by the service provision apparatus 20. One example of data input includes data uploading to the service provisioning apparatus 20. One example of data output includes printing, displaying, etc., of data uploaded to the service provisioning apparatus 20. The equipment unit not shown may be used as the data input source or the data output destination for the service provisioning apparatus 20.

The various equipment units shown in FIG. 1 are to be equipment units installed in a certain company which has a user agreement for the service provided by the service provisioning apparatus 20. For example, the image forming apparatus 10 and the projector 30 are equipment units which are installed in the company and shared by multiple employees. The mobile terminal 40 and the PC 50 are equipment units used by each individual.

Figure 2:
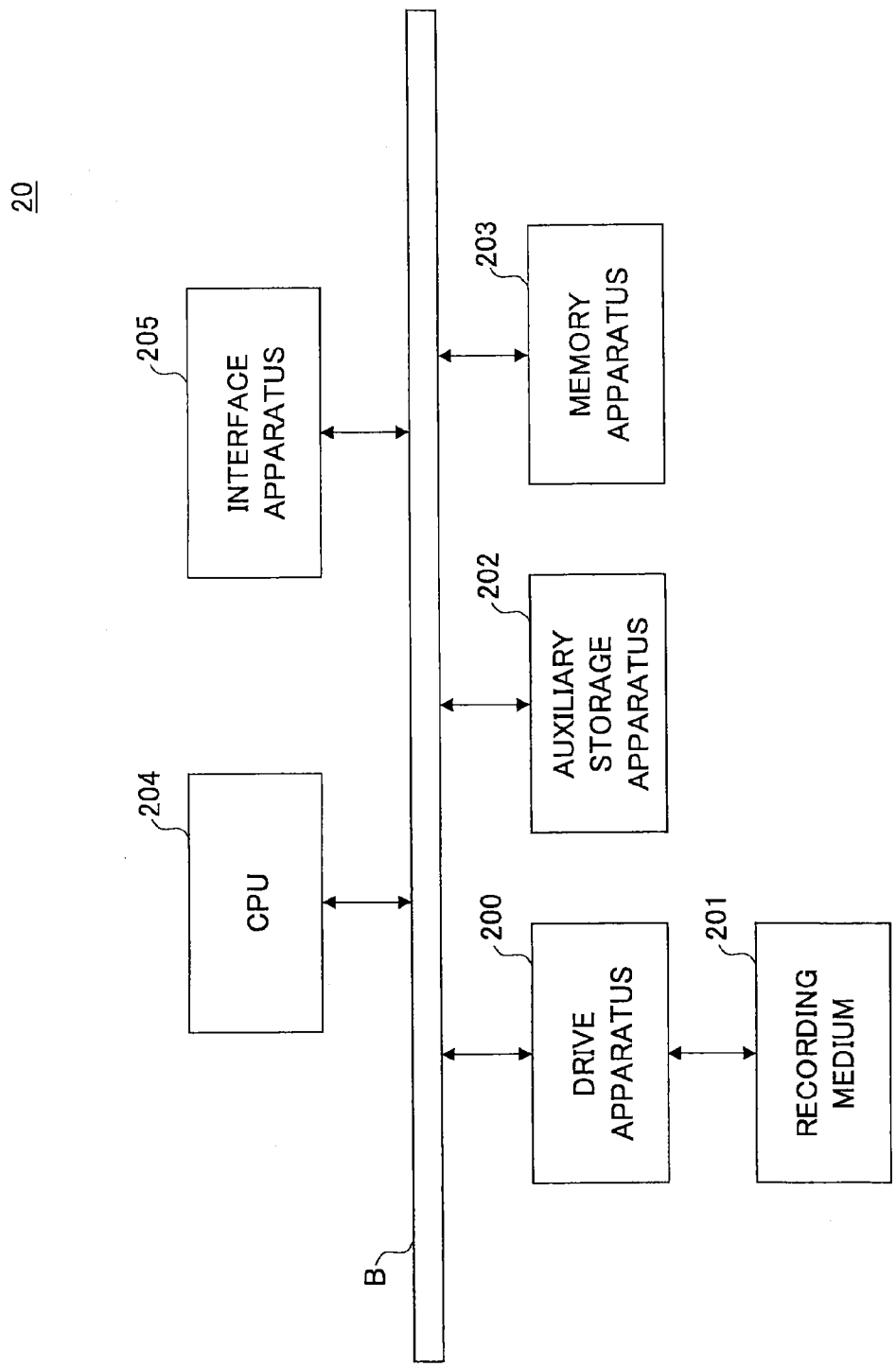
FIG. 2 is a diagram illustrating an exemplary hardware configuration of a service provisioning apparatus according to the embodiment of the present invention.

FIG. 2 is a diagram showing an exemplary hardware configuration of the service provision apparatus according to the embodiment of the present invention. The service provisioning apparatus 20 in FIG. 2 includes a drive apparatus 200, an auxiliary storage apparatus 202, a memory apparatus 203, a CPU 204, and an interface apparatus 205, each of which are connected with one another by a bus B.

Programs for implementing the process in the service provisioning apparatus 20 are provided by the recording medium 201 such as a CD-ROM, etc. When the recording medium 201 which has stored thereon the programs are set in the drive apparatus 200, the programs are installed into the auxiliary storage apparatus 202 via the drive apparatus 200 from the recording medium 201. The installation of the programs, which does not have to be necessarily performed by the recording medium 201, may be downloaded from a different computer via the network. The auxiliary storage unit 202 stores thereon the installed program as well as necessary files, data, etc.

If there is an instruction for launching the programs, the memory apparatus 203 reads the programs from the auxiliary storage apparatus 202 to store therein the read results. The CPU 204 executes functions related to the service provisioning apparatus 20 in accordance with the programs stored in the memory apparatus 203. The interface apparatus 205 is used as an interface for connecting to the network.

The service provisioning apparatus 20 may be configured with multiple computers which include hardware units as shown in FIG. 2. In other words, the below-described processes executed by the service provisioning apparatus 20 may be executed in a manner such that they are distributed among the multiple computers.

Figure 3:
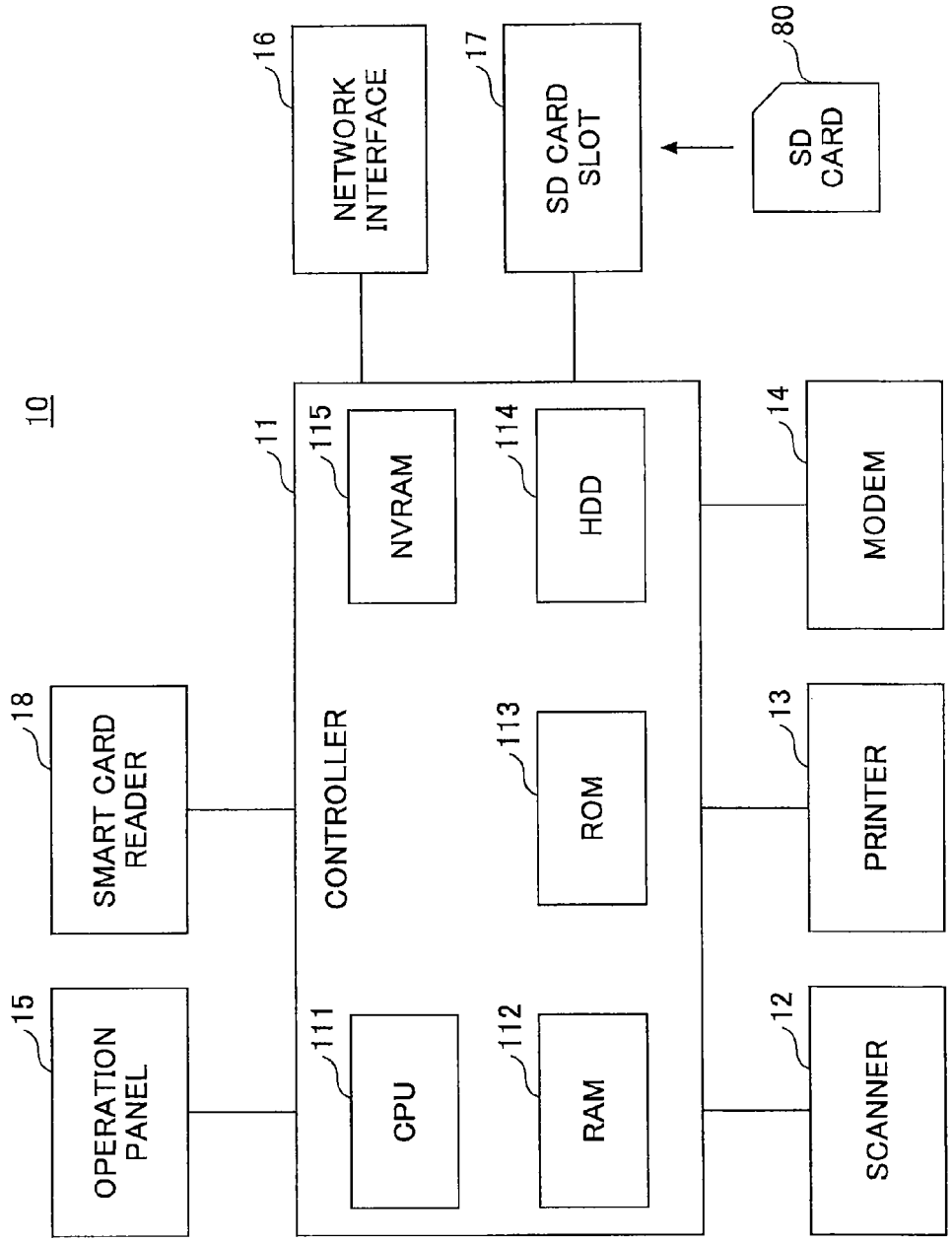
FIG. 3 is a diagram illustrating an exemplary hardware configuration of an image forming apparatus according to the embodiment of the present invention.

FIG. 3 is a diagram showing an exemplary hardware configuration of an image forming apparatus according to the embodiment of the present invention. In FIG. 3, the image forming apparatus 10 includes hardware units such as a controller 11, a scanner 12, a printer 13, a modem 14, an operation panel 15, a network interface 16, an SD card slot 17, an smartcard reader 18, etc.

The controller 11 includes a CPU 111, a RAM 112, a ROM 113, an HDD 114, an NVRAM 115, etc. In the ROM 113 are stored various programs and data, etc., used by the programs. The RAM 112 is used as a storage area for loading the programs, a work area for the loaded programs, etc. The CPU 111 processes the programs loaded into the RAM 112 to realize various functions. In the HDD 114 are stored programs and various data, etc., used by the programs. In the NVRAM 115 are stored various setting information sets, etc.

The scanner 12 is a hardware unit (an image reading unit) for reading image data from a manuscript. The printer 13 is a hardware unit (a printing unit) for printing print data onto a printing sheet. The modem 14, which is a hardware unit for connecting to telephone lines, is used to execute transmission and reception of image data via facsimile communications. The operation panel 15 is a hardware unit which includes an input unit such as a button, etc., that is for accepting an input from a user; a display unit such as a liquid crystal panel, etc. The network interface 16 may be a hardware unit for connecting to the network (regardless of wired or wireless), such as the LAN, etc. The SD card slot 17 is used for reading programs stored in an SD card 80. In other words, in the image forming apparatus 10, not only the programs stored in the ROM 113, but also the programs stored in the SD card 80 may be loaded and executed. The SD card 80 may be replaced by a different recording medium (a CD-ROM, a USB (Universal Serial Bus) memory, etc., for example). In other words, the type of the recording medium that corresponds to the positioning of the SD card 80 is not limited to a predetermined one. In this case, the SD card slot 17 may be replaced by a hardware unit in accordance with the type of the recording medium. The IC card reader 18 reads a card ID from a smart card distributed for each user. The card ID is identification information for each card. According to the present embodiment, the card ID is used as identifying information for the user.

According to the present embodiment, a service called "a cloud pull print" is described as one example of a service provided by the service provision apparatus 20. A name of "the cloud pull print" is for the sake of convenience and is not intended to limit the content of services.

Figure 4:
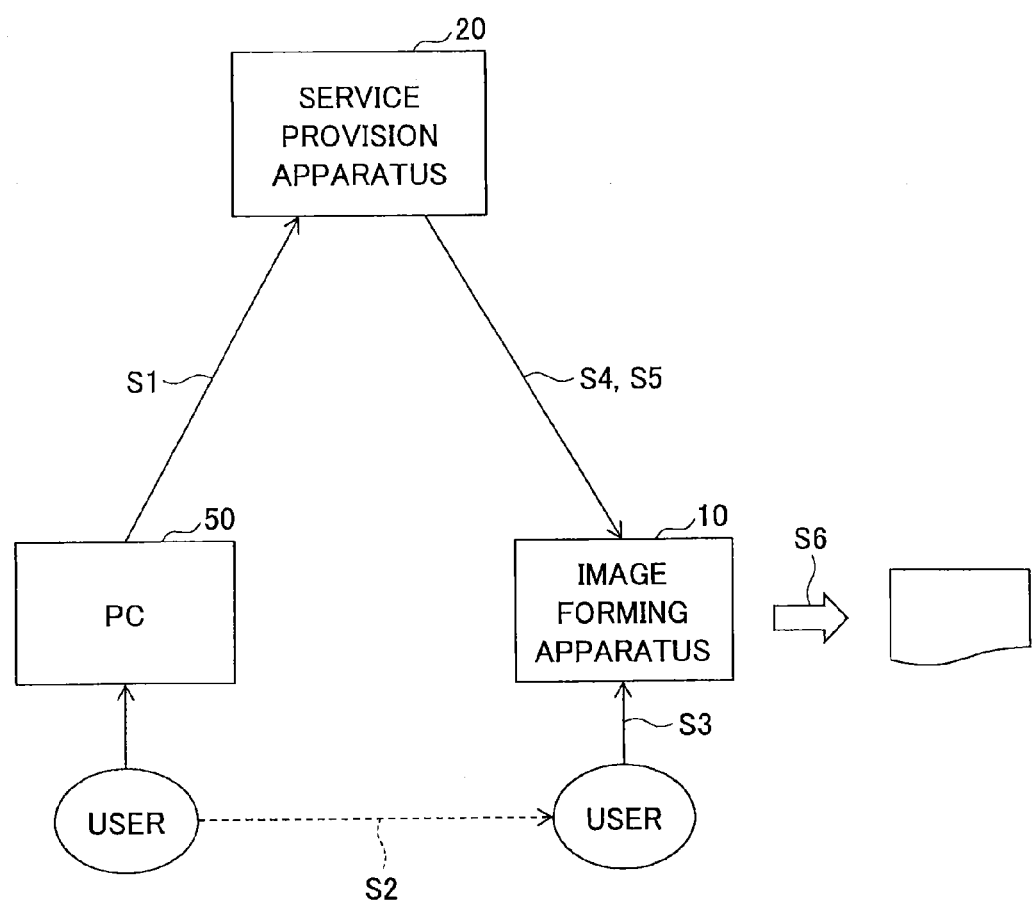
FIG. 4 is a diagram for explaining an overview of a basic processing procedure of a cloud pull print.

FIG. 4 is a diagram for explaining an overview of a basic processing procedure of the cloud pull print. In the following explanation, "a document" is an abstract concept for the existence of an electronic document, image, etc.

For example, a user logs into the service provision apparatus 20 from the PC 50 and uploads a file (below-called "a data file") which contains actual data for a document saved in the PC 50 to the service provisioning apparatus 20 (S1). Then, the user moves to the image forming apparatus 10 (S2), and logs into the image forming apparatus 10 (S3). When use of a cloud pull print service is instructed by the user after the log in, or in response to the log in, the image forming apparatus 10 obtains (downloads) a list of documents uploaded to the service provisioning apparatus 20 and causes the list to be displayed on the operation panel. When the document to be printed from the list is selected by the user, the image forming apparatus 10 obtains (downloads) a data file for the document from the service provisioning apparatus 20 (S5) and prints the obtained data file (S6).

The cloud pull print as described above makes it possible, for example, to cause a document saved in an own PC 50, a mobile terminal 40, etc., to be printed by a user without going through an in-house LAN in a company to which the user belongs. For example, the user may upload, at home, on the road, etc., a document to be printed.

A user which uploads the document and a user which causes the documents to be printed by the image forming apparatus 10 do not have to be the same person. For example, if a user B has a privilege to access the document uploaded by the user A, the user B may instruct the printing. When the document is uploaded, the image forming apparatus 10 of an output destination (a printing destination) is not specified.

In the cloud pull print, the download of the list of the documents or the time required to download the data files of the document may be greatly affected by the responsiveness of network communications between the service provisioning apparatus 20 and the image forming apparatus 10. For example, when the responsiveness of the network communications is poor, the time up to printing of the document or the time up to displaying of the document list from when the instruction by the user is input could exceed a range allowed by the user. The range allowed by the user is a time required such that the user does not feel any stress. For example, in the initial screen displayed first after the log in, when the document list is displayed, the time required for the login, or the time until the image forming apparatus 10 becomes operational may be felt to be very long for the user.

Thus, according to the present embodiment, the projection process is executed for downloading (obtaining) a data file of a document or a document list to an equipment unit. The projection process means that individual information for each user on the function is downloaded to the equipment unit before starting use of the function (application) of the equipment by the user of the equipment unit which is shared by multiple users. Below, information to be downloaded to the equipment unit in the projection process is called "projection information".

Figure 5:
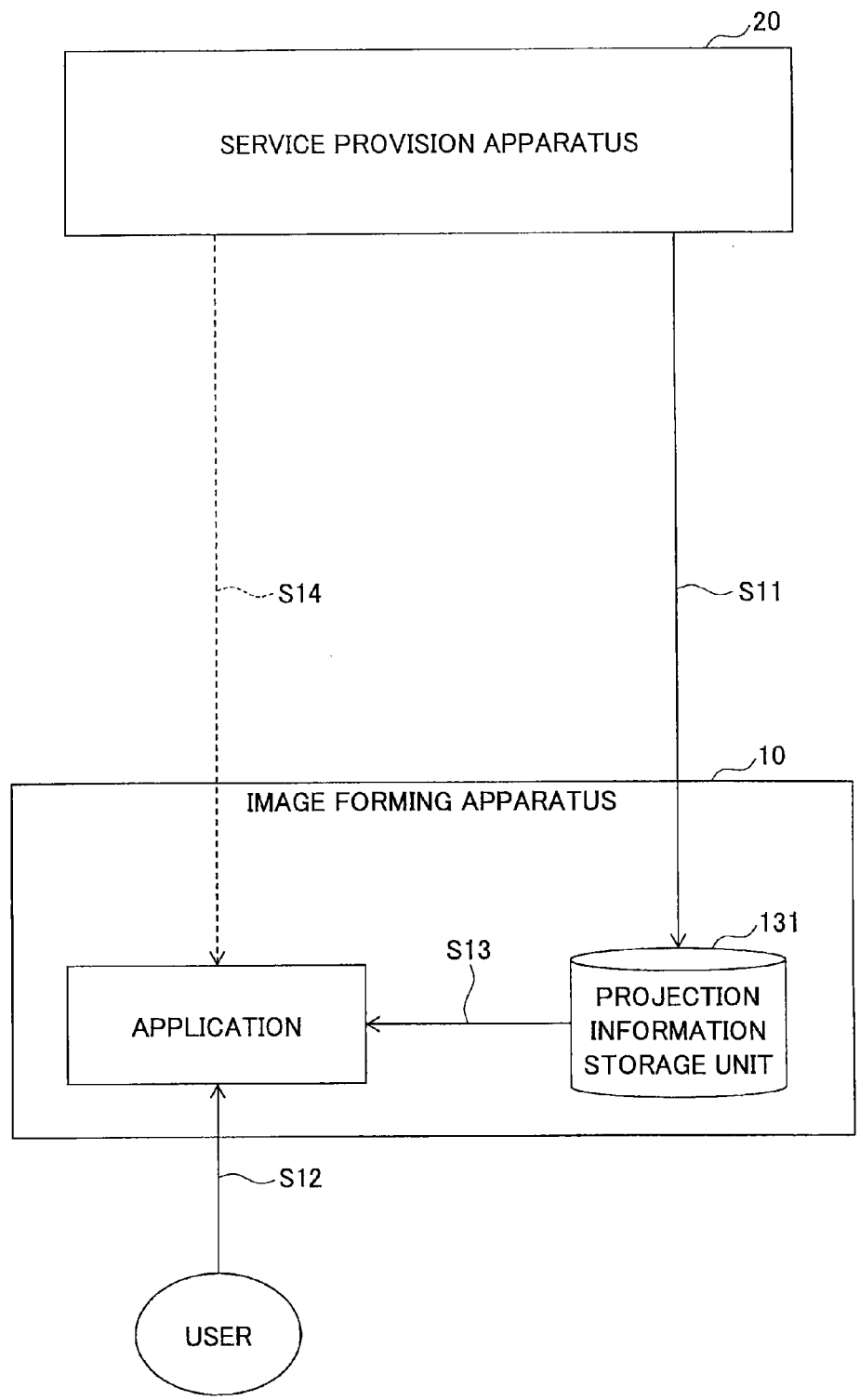
FIG. 5 is a diagram for explaining an overview of a projection process.

FIG. 5 is a diagram for explaining an overview of the projection process. In FIG. 5, before the time (S12) that the user starts using an application of the image forming apparatus 10, projection information on the user on the application is downloaded (obtained) by the image forming apparatus 10 (S1) and stored in the projection information storage unit 131 (S11). When use of the application is started by the user, the application first attempts to obtain, from the projection information storage unit 131, projection information on the user (S13). If it succeeds in obtaining the projection information from the projection information storage unit 131, the application uses the projection information to provide services to the user.

On the other hand, if it fails in obtaining the projection information from the projection information storage unit 131, the application downloads the projection information of the user from the service provisioning apparatus 20 (S14).

In other words, for "the projection", downloading is performed for information of some of the users for some equipment units before which equipment unit is to be used is finally determined. In this sense, the projection process according to the present embodiment is also said to be speculative. Thus, the projection process may also fail. In order to increase the probability of success of the projection process, based on use condition (use history) of the equipment unit by the respective users in the past, the service provisioning apparatus 20 projects or estimates the user and the image forming apparatus 10 to which the projection information is to be downloaded. Thus, the projection process makes it possible to improve the operability on the individual information of the respective users while suppressing an amount of increase of network load or consumption of storage capacity of the image forming apparatus 10 relative to when information on all image forming apparatuses 10 and all users is downloaded in advance on a fixed basis.

Figure 6:
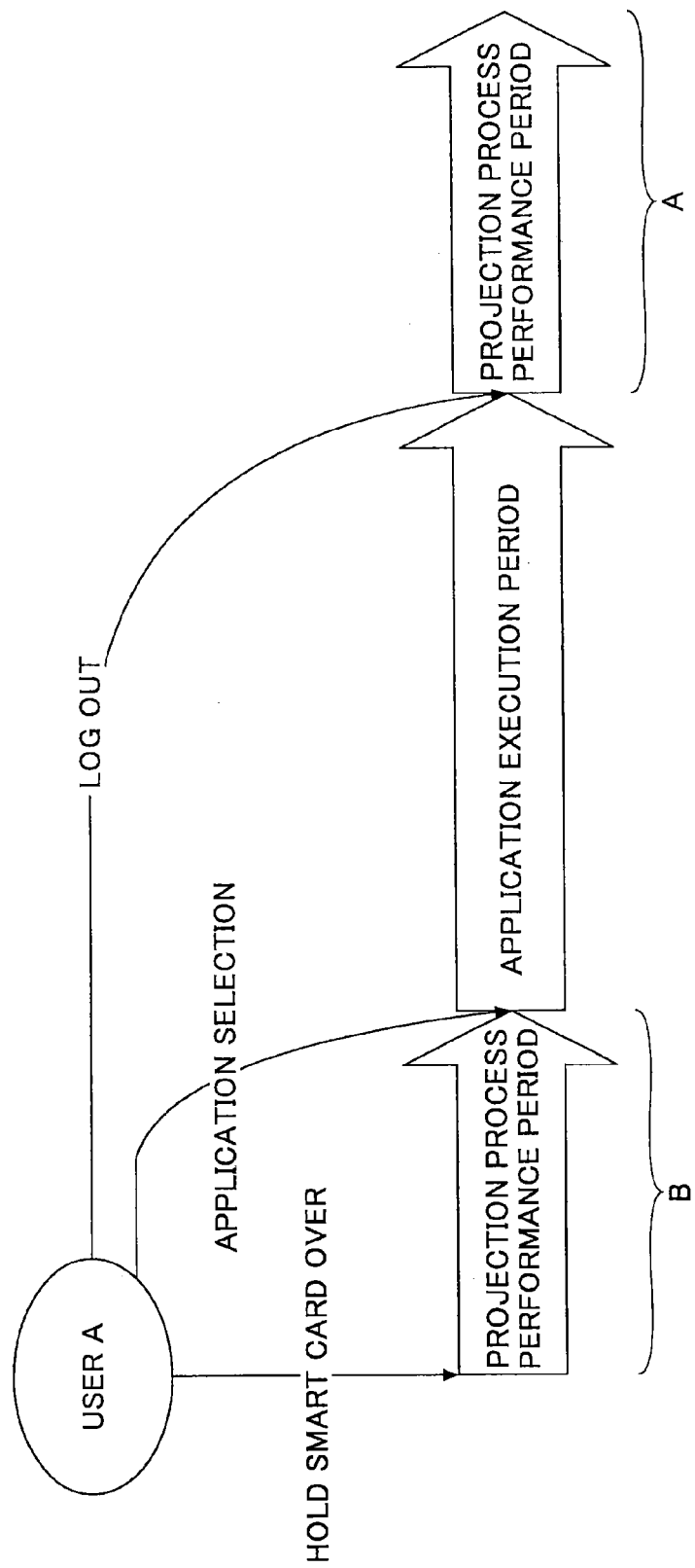
FIG. 6 is a diagram illustrating a period of performing the projection process according to the embodiment of the present invention.

FIG. 6 is a diagram illustrating a period of performing the projection process according to the embodiment of the present invention. As illustrated in FIG. 6, for the projection information on the user A of a certain application, the projection process on the certain image forming apparatus 10 is performed during a period A in which the user A is logged out from the image forming apparatus 1; and a period B which is from when the smart card of the user A is held over the image forming apparatus to when the application is selected to be used. The smart card is used for logging into the image forming apparatus 10 instead of inputting the user name and the password. The image forming apparatus 10, when the smart card is held thereover, returns from the energy saving state, and executes an authentication process based on the smart card. The period required for these processes is the period B. In other words, the period B is from when the smart card is held thereover to when the use of the image forming apparatus 10 becomes possible. While the smart card is used for authenticating the user according to the present embodiment, authentication of the user may be performed based on other information such as a user name, a password, etc.

In the application execution period in the application in FIG. 6, execution of the projection process on the user other than the user A may be allowed or prohibited. Moreover, the projection process may be executed in only one period of the period A and the period B.

According to the present embodiment, a document list which is downloaded to the image forming apparatus 10 in the cloud pull print is one example of projection information for each user. Moreover, an application on the image forming apparatus 10 side that is for implementing the cloud pull print is implemented in a Web application, for example. Here, the Web application is an application which is downloaded from a Web site and executed on a Web browser and implemented using HTML (HyperText Markup Language), CSS (Cascading Style Sheets), script, etc., for example. The script is a Java (registered trademark) script, for example.

In order to implement the cloud pull print and the projection process, etc., described in the above, the service provisioning apparatus 20 and the image forming apparatus 10 include the functional configurations below.

Figure 7:
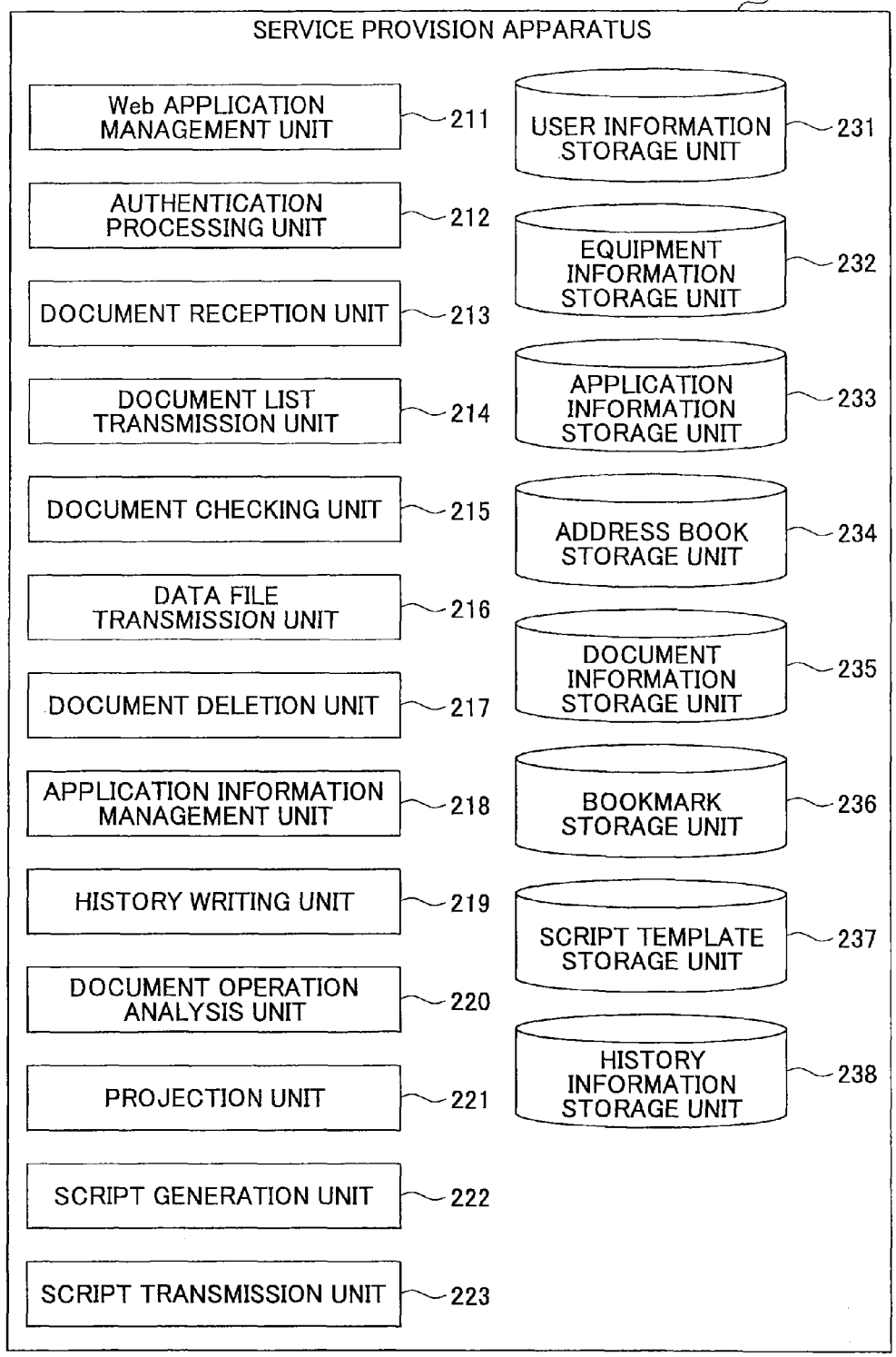
FIG. 7 is a diagram illustrating an exemplary functional configuration of the service provisioning apparatus according to the embodiment of the present invention.

FIG. 7 is a diagram illustrating an exemplary functional configuration of the service provisioning apparatus 20 according to the embodiment of the present invention. In FIG. 7, the service provisioning apparatus 20 includes a Web application management unit 211, an authentication processing unit 212, a document reception unit 213, a document list transmission unit 214, a document checking unit 215, a data file transmission unit 216, a document deletion unit 217, an application information management unit 218, a historical writing unit 219, a document operation analysis unit 220, a projection unit 221, a script generation unit 222, a script transmission unit 223, etc. These respective units are implemented by a process which one or more programs installed in the service provisioning apparatus 20 cause the CPU 204 of the service provisioning apparatus 20 to execute. The service provisioning apparatus 20 also uses a user information storage unit 231, an equipment information storage unit 232, an application information storage unit 233, an address book storage unit 234, a document information storage unit 235, a bookmark storage unit 236, a script template storage unit 237, a historical information storage unit 238, etc. These respective storage units can be implemented using a storage apparatus, etc., connected via a network to the service provisioning apparatus 20, or the auxiliary storage apparatus 202.

The Web application management unit 211 transmits a Web application to the image forming apparatus 10 in response to a request from an equipment unit. The authentication processing unit 212 executes an authentication process on a user of the equipment unit. The document reception unit 213 receives a document uploaded via the network and stores the document in the document information storage unit 235. In response to the request from the equipment unit, the document list transmission unit 214 transmits, to the equipment unit, a list (below-called "document list") of the document information stored in the document information storage unit 235. The document list does not include therein data files of the respective documents. In response to the request from the equipment unit, the document checking unit 215 checks the presence/absence of a specific document. In response to the request from the equipment unit for obtaining the document, a data file related to the document is transmitted (returned) to the equipment unit. In accordance with a request for deleting a document from the equipment unit, the document deletion unit 217 deletes the document. The application information management unit 218 executes retrieval, etc., of information (below "application information") stored in the application information storage unit 233. The historical writing unit 219 writes (records), into the historical information storage unit 238, historical information on various events which occur in the equipment unit and the service provisioning apparatus 20. The document operation analysis unit 220 analyzes an operation on the document uploaded to the service provisioning apparatus 20 based on the historical information. Based on the analysis results of the document operation analysis unit 220, the projection unit 221 projects the image forming apparatus 10 to which the projection information is downloaded, a user which use the image forming apparatus 10, etc., is projected. The script generation unit 222 generates a script (below called "download script") for causing projection information on the image forming apparatus 10 and the user that is projected by the projection unit 221 to be downloaded to the image forming apparatus 10. The script transmission unit 223 transmits a download script generated by the script generation unit 222 to the image forming apparatus 10 projected by the projection unit 221.

The user information storage unit 231 stores information for each user (below called "user information"). The equipment information storage unit 232 stores therein information (below called "equipment information") for the respective various equipment units shown in FIG. 1. The application information storage unit 233 stores application information for each application. The address book storage unit 234 stores therein an address book for each user. The bookmark storage unit 236 stores therein a list (below-called "a bookmark") of applications which are available for each user. The script template storage unit 237 stores therein a template of a download script. The historical information storage unit 238 stores historical information of various events which occur in response to execution of the process.

Figure 8:
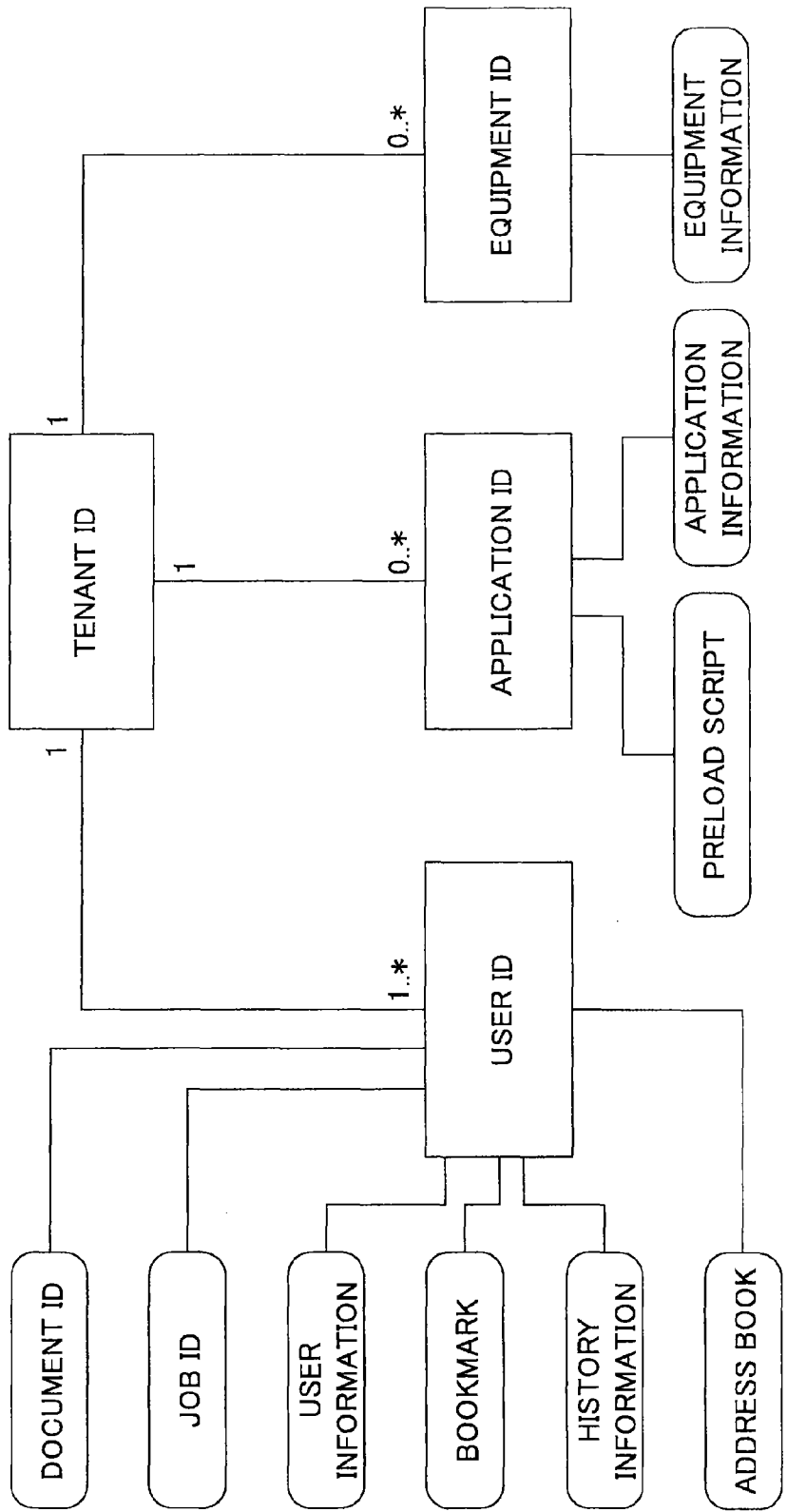
FIG. 8 is a diagram illustrating relationships among the respective information sets which are managed in the service provisioning apparatus according to the embodiment of the present invention.

FIG. 8 is a diagram illustrating relationships among the respective information sets which are managed in the service provision apparatus according to the embodiment of the present invention.

In FIG. 8, a tenant ID is identification information for the respective tenants having a use agreement of a service provided by the service provisioning apparatus 20. The tenant may be a company, for example. The tenant may be a department which makes up a company, or an organization, an association, an individual, etc., other than the company.

To the tenant ID is linked an equipment ID of various equipment units registered to the tenant, an application ID of the respective application for which the tenant has a use agreement, and a user ID of the respective users which belong to the tenant.

The user ID is identification information for each user. The respective users are classified according to a combination of the tenant ID and the user ID. The user ID is linked to the document ID, the job ID, the bookmark, the historical information, and the address book. The document ID is identification information for each document. The user ID linked to the document ID is a user ID of a destination or a user ID on an upload source of the document. The job ID is identification information for each job which is executed by the service provisioning apparatus 20. The user ID linked to the job ID is a user ID related to an executer of the job. The bookmark is set for each user. Therefore, the user ID is linked to the respective bookmarks. The user ID linked to the historical information is a user ID of the user associated with the event related to the historical information. The address book is set for each user. Therefore, the user ID is linked to the respective address books.

An application ID is identification information for the application. The application ID is linked to the application information, download script, etc. In other words, the download script is defined for each application. The equipment ID is identification information for each equipment unit body (individual body) of the equipment unit. The equipment ID is linked to the equipment information.

Figure 9:
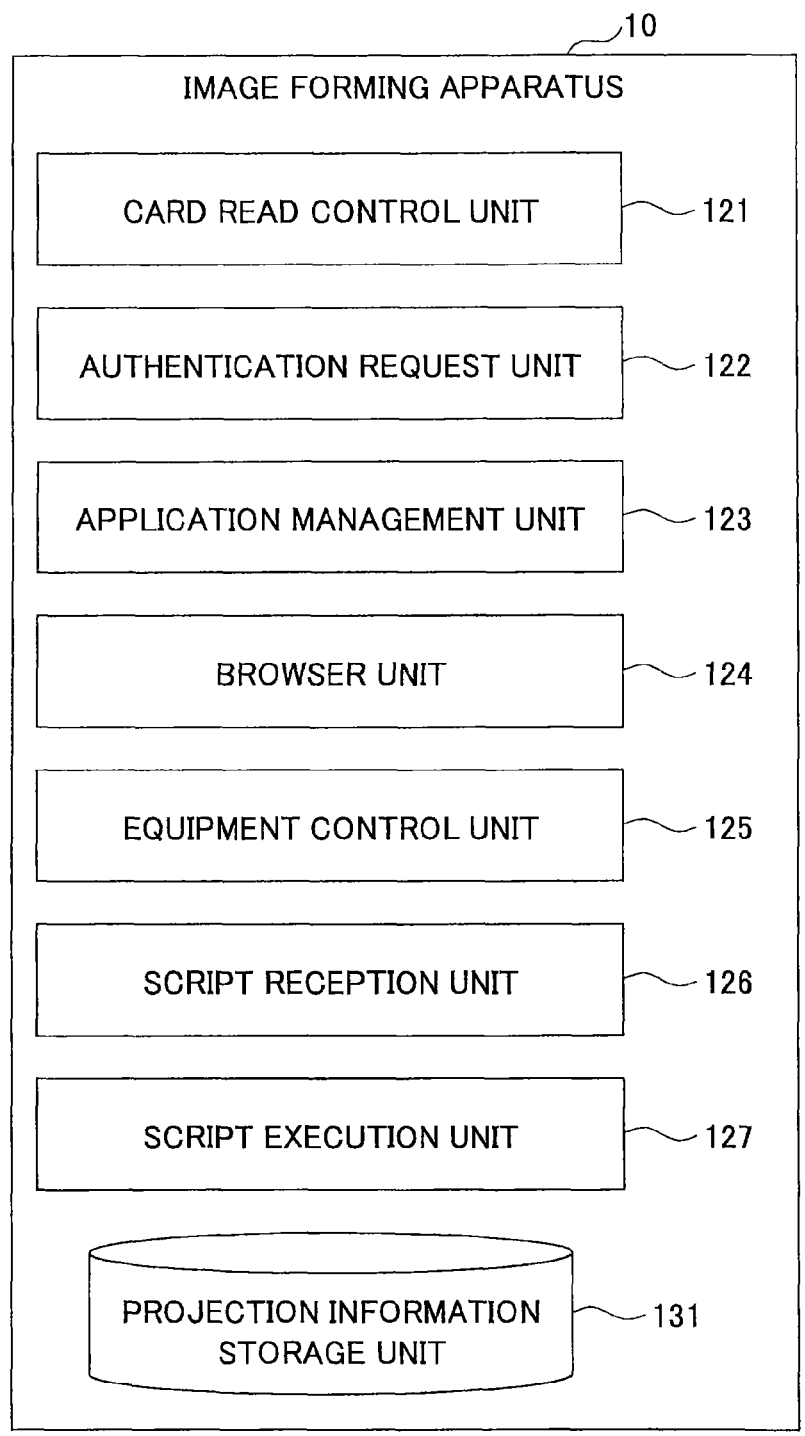
FIG. 9 is a diagram illustrating an exemplary functional configuration of an image forming apparatus according to the embodiment of the present invention.

FIG. 9 is a diagram illustrating an exemplary functional configuration of an image forming apparatus according to the embodiment of the present invention. In FIG. 9, the image forming apparatus 10 includes a card read control unit 121, an authentication request unit 122, an application management unit 123, a browser 124, an equipment control unit 125, a script receipt unit 126, a script execution unit 127, etc. The image forming apparatus 10 also uses a projection information storage unit 131. The projection information storage unit 131 can be implemented using an HHD 114, or a storage apparatus, etc., connected via a network to the image forming apparatus 10.

The card read control unit 121 controls reading of the card ID from the smart card which is held over the IC card leader 18. The authentication request unit 122 requests the service authentication apparatus 20 authentication of the user based on the card ID read by the card read control unit 121. The application control unit 123 performs the active control of the application, determination of the application to be activated, etc. The browser unit 124 performs downloading of the Web application, display control, execution control, etc. of the Web application. The equipment control unit 125 performs control, etc., of the hardware unit of the image forming apparatus 10. The script reception unit 126 receives a download script from the service provisioning apparatus 20. Based on the download script received by the script reception unit 126, the script execution unit 127 executes downloading of projection information based on the download script received by the script reception unit 126. The projection information storage unit 131 stores therein projection information obtained.

Figure 10:
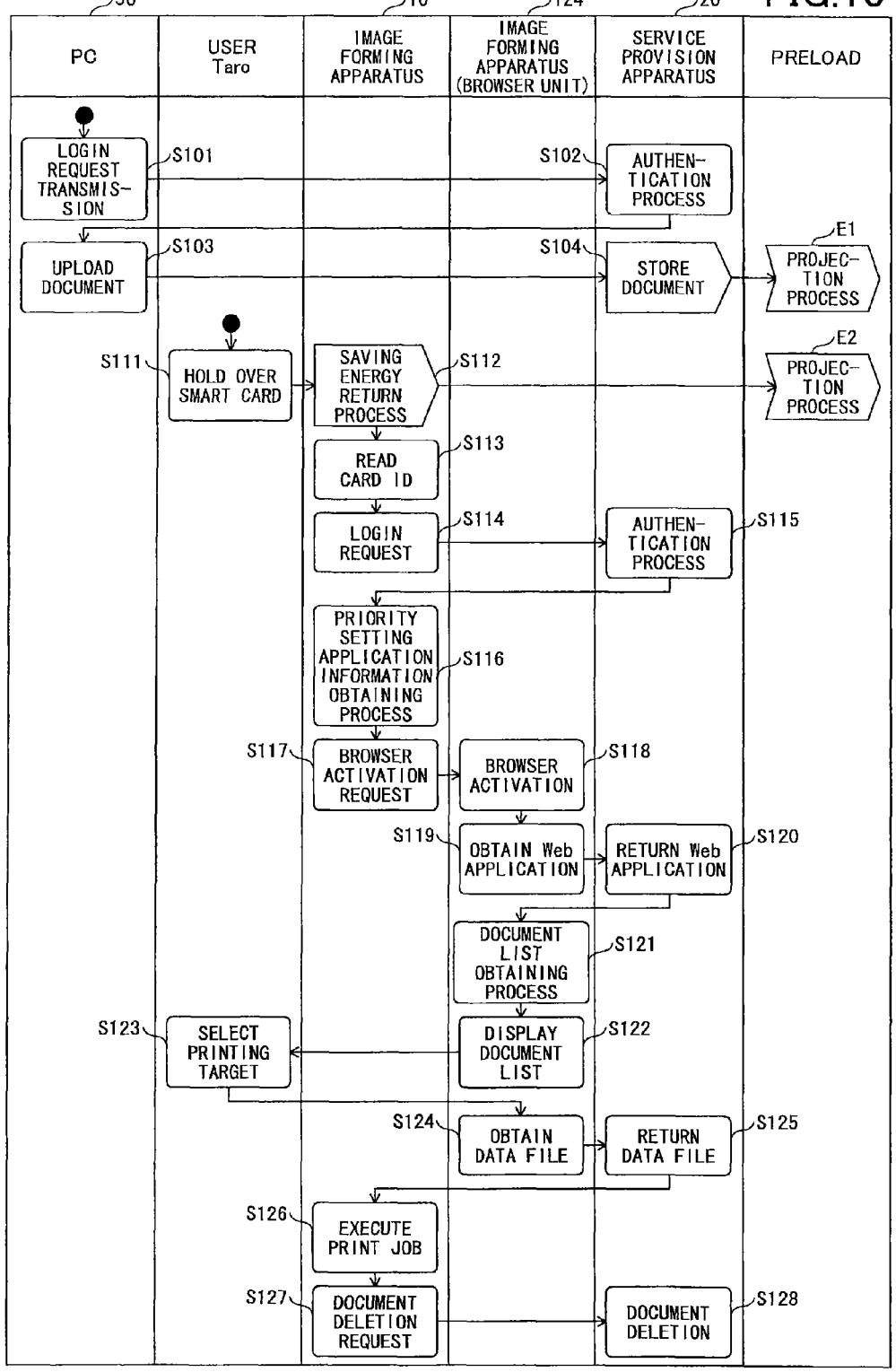
FIG. 10 is a diagram for explaining an example of the basic processing procedure of the cloud pull print.

Below, a processing procedure executed by the information processing system 1 is described. FIG. 10 is a diagram for explaining an overview of a basic processing procedure of the cloud pull print. FIG. 10 describes an example in which the user Yoko uploads a document using the PC 50 and the user Taro instructs printing of the document. Moreover, the image forming apparatus 10 used by the user Taro is called "a target equipment unit" below.

As an initial state, a login screen on the service provision apparatus 20 is displayed on the PC 50. For example, the log in screen may be displayed on the Web page downloaded from the service provision apparatus 20. A web browser of the PC 50, for example, causes the PC 50 to execute the process executed by the PC 50 shown in FIG. 10.

In step S101, when the user Yoko inputs a tenant ID, user ID, and a password into the login screen displayed on the PC 50, the PC 50 transmits a log-in request including a password, a user ID, and a tenant ID to the service provisioning apparatus 20. The authentication processing unit 212 of the service provisioning apparatus 20 executes an authentication process on the password, the user ID, and the tenant ID included in the log-in request (S102). More specifically, if a record including the tenant ID, the user ID, and the password is stored in the user information storage unit 231, it is determined that the authentication is successful.

FIG. 11 is a diagram illustrating an exemplary configuration of a user information storage unit. In FIG. 11, the user information storage unit 231 stores the tenant ID, the name, the user ID, the password, the card ID, an affiliated department name, a privilege, etc., for each user who can use a service of the service provisioning apparatus 20.

If the authentication fails, the subsequent process is stopped. If the authentication succeeds, the authentication processing unit 212 generates a ticket (cookie) which shows a success of a log-in, and returns the ticket, and a Web page on which an uploaded screen is displayed is returned to the PC 50. In the service provisioning apparatus 20, the ticket is stored in association with the user ID and the tenant ID of the authenticated user. Moreover, a ticket is included in the subsequent requests from the PC 50. Therefore, the service provisioning apparatus 20 may specify the user ID and the tenant ID related to the request from the respective PC 50 based on a ticket included in the request.

The upload screen is a screen for selecting a document to be uploaded, a destination of the document, etc. The destination of the document means a user or group which is allowed to access the document. The group is a concept with respect to multiple user sets such as a department, etc., for example. The destination which can be designated by the user Yoko is specified based on the address book storage unit 234.

FIG. 12 is a diagram illustrating an exemplary configuration of an address book storage unit. In FIG. 12, the address book storage unit 234 stores a destination ID, telephone number, a mail address, etc., for each destination which can be specified by the user as a delivery destination for information in association with the user ID of the respective users. The destination ID is a user ID of a group or a user which can be specified as a destination. The telephone number and the mail address are a telephone number and a mail address of the user that can be designated as the destination.

In FIG. 12, the destination IDs which can be specified by the user Yoko is "Taro" and "xxx". Therefore, a Web page of the upload screen is generated with these destination IDs being set as selections of the destination.

The PC 50 received by the Web page displays the upload screen. When the document to be uploaded, the destination of the document, etc., are selected via the upload screen by the user Yoko, the PC 50 transmits (updates) the data file of the document to the service provisioning apparatus 20 (S103). When the document reception unit 213 of the service provisioning apparatus 20 receives the data file, the data file is stored in the auxiliary storage apparatus 202, for example, and bibliographical information of the document on the data file is stored into the document information storage unit 235 (S104). Uploading and storage of the document is an event (below called "an event E1") which execution is to be triggered by the projection process. The projection process executed in response to the event E1 applies to the projection process executed in a period A in FIG. 6.

FIG. 13 is a diagram illustrating an exemplary configuration of a document information storage unit. In FIG. 13, the document information storage unit 235 stores bibliographical information including a document ID, a document type, a URI, a size, a date/time, a preparer, a format, a destination, etc., for the document uploaded. The document type is a type of document when the respective documents are classified from a viewpoint of user operation. The URI is information indicating a storage location of a data file of a document in the service provisioning apparatus 20. The size is a data size of the data file. Date/time is a date/time at which the document is uploaded, or in other words, a date/time at which the document is received by the document reception unit 213. If it is information indicating timing at which the document is uploaded, information other than date/time, etc., may be used instead of the date/time. The creator is the user ID of the user uploaded by the document. In other words, it is the log ID of the log user according to the upload request of the document. The format is a data format of the data file. The destination is a destination of the document. In other words, the destination is a user or a department, etc., which include an access privilege for the document. If the destination is the department, an access privilege is provided to a user which belongs to the department.

The document ID is automatically allocated by the document reception unit 213. The URI, size, date/time, creator, and format are determined automatically by the document reception unit 213. The document type and the destination are included in the upload request. For example, the document type and destination are designated by the user Yoko in the upload screen.

Then, when the user Taro holds the smart card over the smart card reader 18 of the target equipment unit (S111), the target equipment unit returns from the energy saving state (S112). Returning from the energy saving state of the target equipment is an event (below called "event E2") to be a trigger for the projection process. The projection process executed in response to the event E2 applies to the projection process executed in a period B in FIG. 6.

Next, the card read control unit 121 of the target equipment unit controls reading of the smart card from the smart card (S113). Next, the authentication request unit 122 of the target equipment unit transmits the log-in request including the card ID is transmitted to the service provisioning apparatus 20 (S114). The authentication processing unit 212 of the service provisioning apparatus 20 executes an authentication process on the card ID included in the log-in request (S115). More specifically, if a record including the card ID is stored in the user information storage unit 231 (FIG. 11), it is determined that authentication is successful. If the authentication fails, the subsequent process is stopped. If the authentication succeeds, the authentication processing unit 212 returns a response indicating the success of authentication to the target equipment unit.

Next, the application management unit 123 of the target equipment unit executes the process of obtaining the priority setting application on an authenticated user Taro (S116). The priority setting application, which is an application to be operated on first after launching of the image forming apparatus 10, is set for each user. The priority setting application information is application information on a priority setting application. Information showing a priority setting application of each user is stored in a bookmark storage unit 236 of the service provisioning apparatus 20.

FIG. 14 is a diagram illustrating an exemplary configuration of a bookmark storage unit. In FIG. 14, the bookmark storage unit 236 stores information indicating whether each application is a priority setting application; and an application ID of an application which can be used by the user in association with the user ID of the respective users. The bookmark storage unit 236 shown in FIG. 14 stores therein that the application ID of the priority setting application of the user Taro stores the "Pull Print". The "Pull Print" is an application ID for the cloud pull printing.

Moreover, the application information corresponding to the application ID is stored in the application information storage unit 233. FIG. 15 is a diagram illustrating an exemplary configuration of an application information storage unit. In FIG. 15, the application information storage unit 233 stores the application ID, the application name, the Type, the URI, the installation method, the function, the tenant ID, etc.

The application name is a name of the application. The Type is information indicating whether it is a Web application or a native application. The URI is information indicating the location of the application. The installation method is a method of installation of the application. "On demand" indicates downloading to the equipment unit at the time of using the application. "Advance" indicates the installation in advance of using the application. The function indicates a function provided by the application. The tenant ID is a tenant ID of a tenant which has a use agreement of the application.

Here, application information is obtained which is stored in a record whose application ID is "PullPrint".

Next, the application management unit 123 determines that the browser unit 124 is activated based on the value of the Type of the application information obtained. Then, the application management unit 123 specifies the URI of the application information to request activation to the browser unit 124 (S117). The browser unit 124 is activated in response to the request (S118). In response to the activation, a request for obtaining the Web application of the cloud pull print is transmitted to the service provision apparatus 20 (S119). The obtaining request is transmitted to the URI specified in step S117. The Web application management unit 211 of the service provision apparatus 20 returns the contents of the Web application of the cloud pull print according to the obtaining request (S120). For example, HTML, CSS, script, etc., which make up the Web application are returned.

Next, based on the script which makes up the Web application of the cloud pull print, the browser unit 124 executes the process of obtaining a document list related to the user Taro (S121). The document list is obtained from the projection information storage unit 131 if the projection process succeeds, while it is obtained from the service provisioning apparatus 20 if the projection process fails.

Next, based on the HTML and CSS which make up the Web application of the cloud pull print and the document list obtained, the browser unit 124 causes the document list screen to be displayed on the operation panel 15 (S122).

Figure 16:
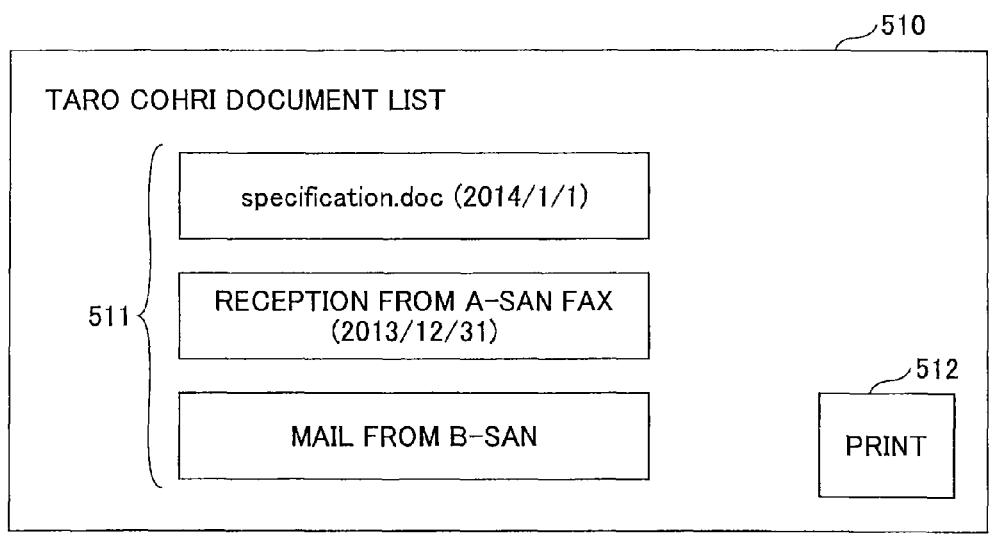
FIG. 16 is a diagram illustrating exemplary displaying of a document list screen.

FIG. 16 is a diagram illustrating exemplary displaying of a document list screen. In FIG. 16, the document list screen 510 includes a document list 511, a print button 512, etc. The document list 511 is a document list obtained in step S121. At least one document to be printed is selected in the document list 511, and, when a print button 512 is pressed (S123), the browser unit 124 transmits, to the service provisioning apparatus 20, a request for obtaining a data file on a document selected based on a script which makes up a Web application of a cloud pull print (S124). A document ID of a document selected is included in the obtaining request.

The data file transmission unit 216 of the service provision apparatus 20 obtains, from the auxiliary storage apparatus 202, for example, a data file on a document ID included in the acquisition request, and returns the obtained data file to the target equipment unit (S125). The location at which the data file is saved can be specified based on the URI stored in the document information storage unit 235 in association with the document ID. The data file returned to the target equipment unit does not have to be limited to the file format.

In the target equipment unit, when the data file is received, the equipment control unit 125 executes the print job on the data file (S126). Next, the equipment control unit 125 transmits a request for deleting a document related to the data file to the service provisioning apparatus 20 (S127). A document ID of a document printed is included in the deleting request. The document deletion unit 217 of the service provisioning apparatus 20 deletes a data file related to a document ID included in the deletion request and deletes a record related to the document ID from the document information storage unit (S128).

Next, a projection process executed in response to uploading of the document is described. The projection process is a projection process executed in a period A in FIG. 6.

Figure 17:
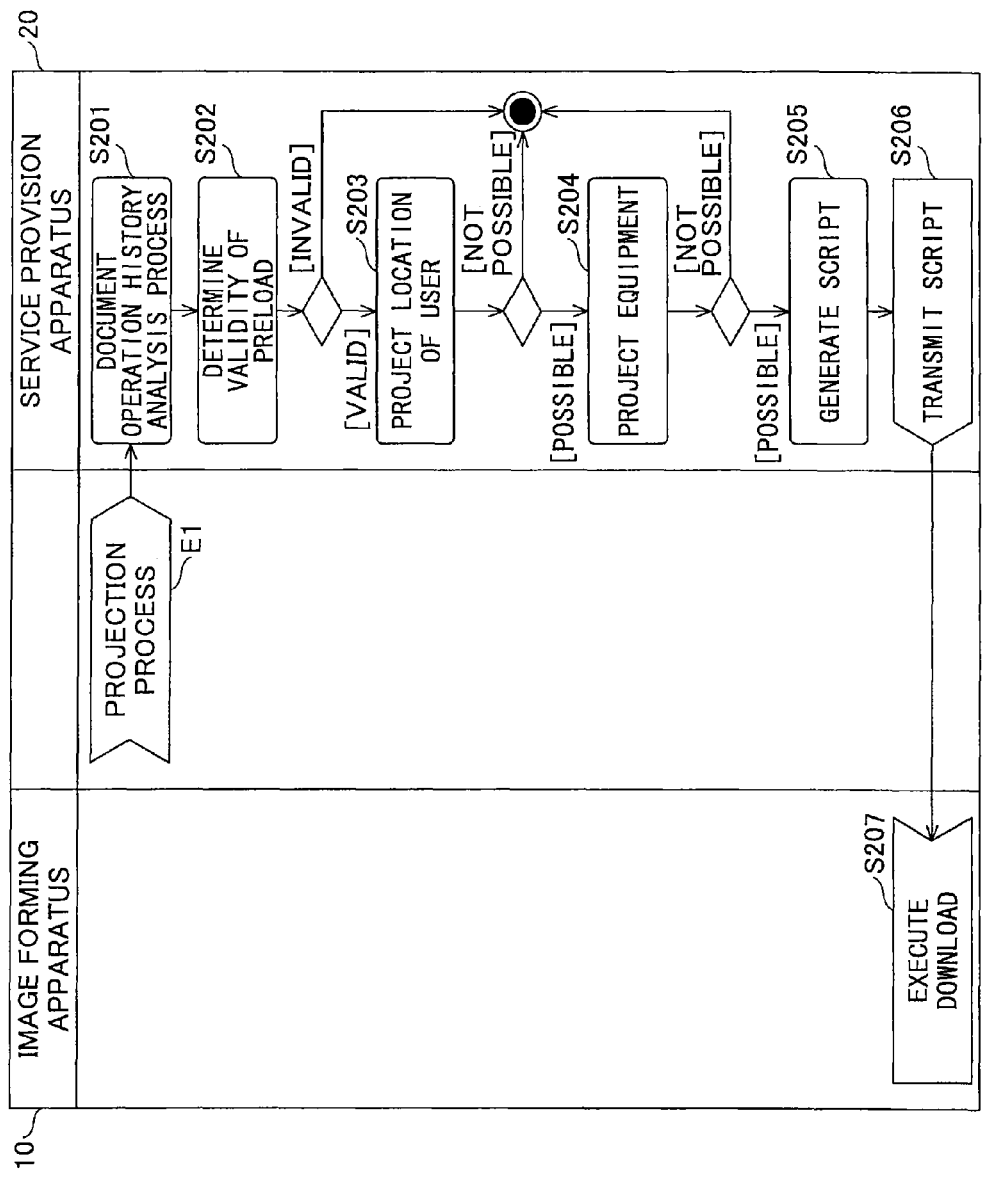
FIG. 17 is a diagram for explaining one example of a processing procedure of a projection process that is executed in response to uploading of a document.

FIG. 17 is a diagram for explaining one example of a processing procedure of a projection process that is executed in response to uploading of a document.

The document operation analysis unit 220 of the service provisioning apparatus 20 in response to the occurrence of the event E1 (uploading of document) in FIG. 10 analyses historical information stored in the historical information storage unit 238 (S201). Here, the document ID (below called "target document") of the document uploaded in the event E1 is assumed to be "Doc9" (see FIG. 13). In other words, the target document is a document which is uploaded by the user Yoko and whose destination is the user Taro.

FIG. 18 is a diagram illustrating an exemplary configuration of a historical information storage unit. As shown in FIG. 18, a history of information on various events which occur in response to use of the image forming apparatus 10 is stored in a time series. One record stores a historical number, a date/time, a position, a user ID, a document ID, an application ID, a job ID, an equipment ID, an event content, etc.

The historical number is identification information for each record of the historical information storage unit 238. The date/time is a date/time in which the event occurs. If it is information indicating timing at which the event occurs, information other than date/time, etc., may be used instead of the date/time. The position is information indicating the location of the equipment unit related to the event. The user ID is a user ID of a user who performed an operation to be a cause of the event. When the event is concerned with an operation on the document, the document ID is an ID of the document to be operated. The application ID is an application ID of the application which performed a process associated with the event. The job ID is a job ID of a job associated with the event by the application related to the application ID. The equipment ID is an equipment ID of the equipment unit which is operated by the user on the event. The event content is information indicating the content of the event.

The historical information is successively stored into the historical information storage unit 238 by the historical writing unit 219 of the service provision apparatus 20. In the event which occurs in the equipment unit, when a request is transmitted on the event from the equipment unit, the historical writing unit 219 stores the historical information to the historical information storage unit 238 in accordance with the request. Moreover, even an event for which it is not explicitly stated that an occurrence thereof is reported to the service provisioning apparatus 20 may be reported as required from an equipment unit in FIG. 10 as shown in "document list displaying", which is the fourth item from the bottom, or in "printing", which is the second item from the bottom. Alternatively, in a request which is stored in the equipment unit and which is transmitted to the service provisioning apparatus 20 at the time of or after the event, the event stored in the equipment unit up to the expiring may be collectively reported. For example, "the document list displaying" may be reported in a request for obtaining the data file of step S124. Moreover, the "printing" may be reported with a request for deleting a document in step S127.

A value of a position included in the historical information may be specified with reference to the equipment information storage unit 232 based on the equipment ID, for example.

FIG. 19 is a diagram illustrating an exemplary configuration of an equipment information storage unit. In FIG. 19, the equipment information storage unit 232 stores the equipment ID, the equipment name, the equipment type, the function, the installation location, etc., for each equipment unit registered on the tenant in association with the tenant ID. The equipment name has the same meaning as the equipment type. The equipment type is information which clearly demonstrates the performance of the type related to the equipment name. The function is a function included by the equipment unit. The installation location is a location installed by the equipment unit. The installation location may be a building, a floor, a pillar number, etc., for example.

The location of the historical information may be an establishment location stored in the equipment information storage unit 232 for the equipment ID included in the history information. Moreover, information indicating the position of the equipment may be transmitted to the service provisioning apparatus 20 included in the request, etc., from the equipment unit. Information indicating the position of the equipment unit may be information specified by the GPS function if the equipment unit includes a GPS function. Moreover, a fixed equipment unit such as the image forming apparatus 10 may store therein information indicating the installation location of the equipment unit.

In S201 in FIG. 17, a history related to an operation of the document is extracted from information stored in the historical information storage unit 238. In other words, in the historical information storage unit 238 is included a history on printing of a document, a history on uploading of the document, etc. Therefore, information on uploading and information on downloading (output) may be associated based on historical information including a document ID of a certain document. Then, in step S201, information on the uploading and information on the downloading are extracted and associated for each document first. According to the present embodiment, a series of operations of a document that is configured by uploading and uploading of the document is called "delivery of the document". Moreover, information on the downloading destination and information on the uploading destination for the document is called "delivery information".

FIG. 20 is a diagram illustrating exemplary extraction of delivery information on a document from historical information. FIG. 20 shows uploading information on the document and downloading information on the document for each document delivered.

The upload information includes items such as a document type, a date/time, From, To, etc. The document type is a document type of a document uploaded. The date/time is a date/time at which the uploading was performed. The From is a user ID of a user related to an uploading source (transmission source). A value of the user ID in historical information on uploading is a value of the From. The To is a user ID specified as the destination in the uploading.

For example, in FIG. 20, the uploading information on the document whose document ID is "Doc 9" is based on history information whose historical number is "LID261201" in the historical information storage unit 238 (FIG. 18). The value of To and the document type of the upload information is a value of the destination or document type stored in the document information storage unit 235 on the document ID related to the upload information.

The download information includes an item such as delay, a user ID, a position, a machinery ID, an application ID, etc. The delay is an elapsed time up to when downloading is performed from uploading. In other words, it is an elapsed time from the date/time of historical information on the uploading to the date/time of historical information on downloading. The user ID is a user ID of a user which performed downloading. The location is a location of the image forming apparatus 10 used for downloading. The equipment ID is a machinery ID of the image forming apparatus 10. The application ID is an application ID of the application related to downloading. The application ID, the equipment ID, the position, and the user ID of the download information is an application ID, an equipment ID, a position, and a user ID of the historical information on the downloading.

For example, in FIG. 20, the uploading information on the document whose document ID is "Doc 9" is based on historical information whose historical number is "LID261218" in the historical information storage unit 238 (FIG. 18).

In this way, delivery information is extracted for each document. The delivery information is extracted from historical information within a predetermined time from the present time, for example. For example, according to the present embodiment, historical information within one hour from the present time is to be extracted. The range of historical information from which delivery information is to be extracted may be determined as needed.

Next, the document operation analysis unit 220 classifies delivery information on the user Yoko of an upload source on an event E1 to be a trigger in step S201. The classification of the delivery information is performed based on the delivery destination. The difference between the destination and the delivery destination is that the destination refers to a user allowed as a destination at the time of uploading, whereas the distribution destination refers to a user which actually performed downloading. For example, on the document on which the specification X is specified as the destination, the delivery destination for a case in which downloading (printing) is executed by the user Taro is user Taro.

Figure 21:
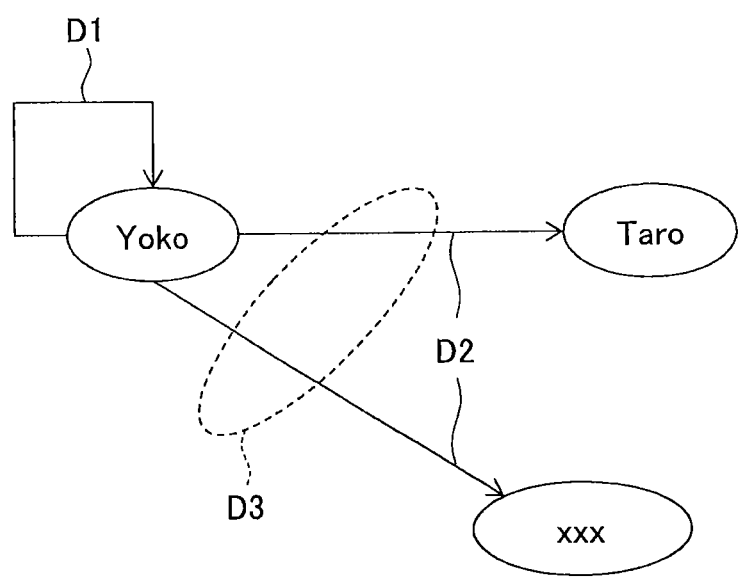
FIG. 21 is a diagram for explaining a candidate delivery destination of a document according to the present embodiment.

FIG. 21 is a diagram for explaining a candidate delivery destination of a document according to the embodiment of the present invention. FIG. 21 shows a case in which the user Yoko is a delivery source (an uploading source) of the document.

As shown in FIG. 21, there are three ways for the candidate of the delivery destination for the document. A case D1 is a case in which the person himself is set to be a delivery destination. A case D2 is a case in which delivery is made to a specific individual. A case D3 is a case in which delivery is made to a group such as a department, etc., that includes a user Taro, a user xxx, etc.

The classification of the delivery information is further performed based on the document type. Therefore, the delivery information for the document uploaded by the user Yoko is classified as shown in FIG. 22, for example.

Figure 22:
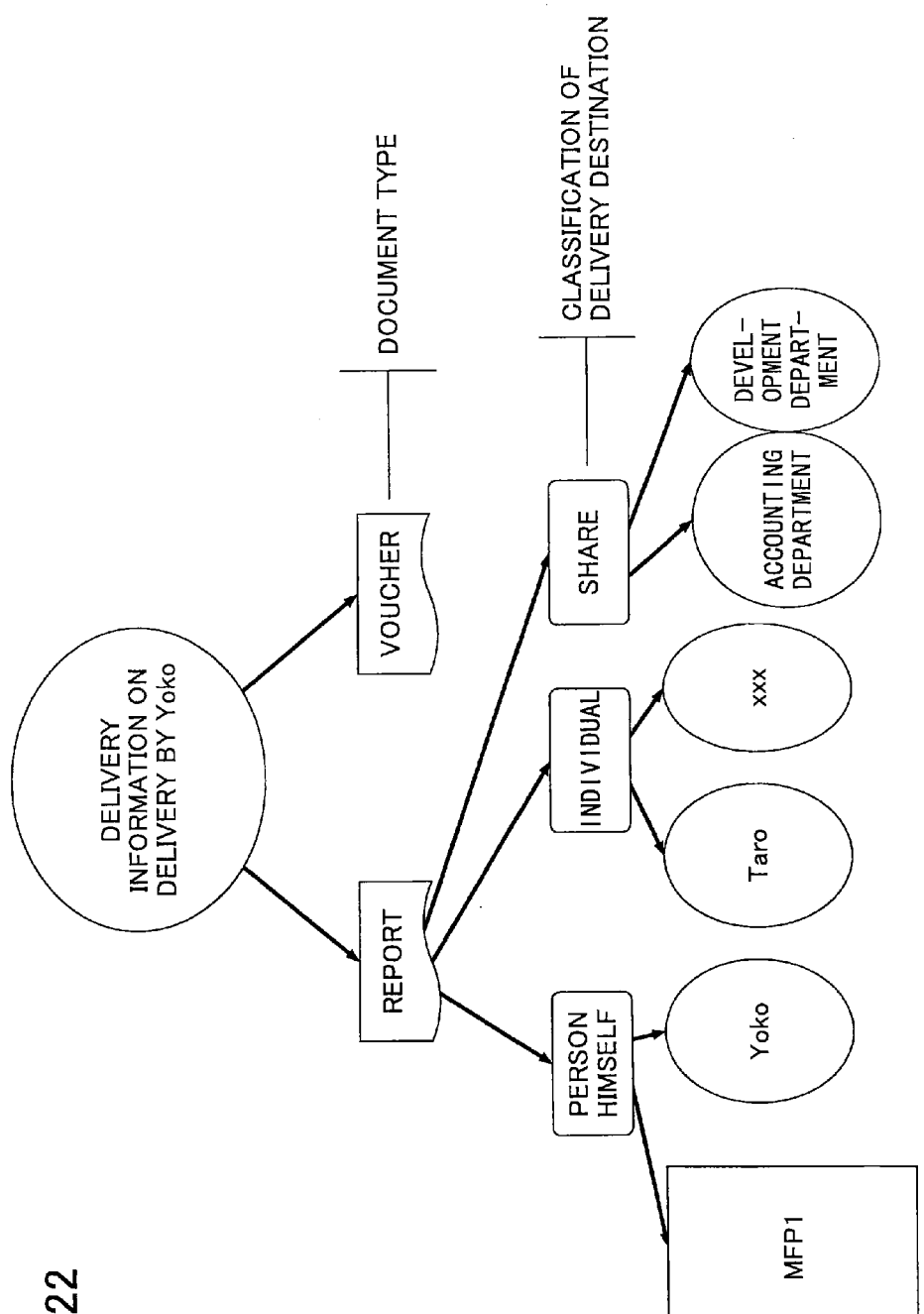
FIG. 22 is a diagram illustrating an example of a classification of distribution information according to a certain user.

FIG. 22 is a diagram illustrating an example of a category of delivery information related to a certain user. As shown in FIG. 22, delivery information of a document uploaded by the user Yoko is classified based on the document type first. Next, the classification is based on the delivery destination. When the delivery destination is the person himself, a specific equipment unit such as an "MFPI", etc., for example, may be specified.

The document operation analysis unit 220 classifies delivery information shown in FIG. 20 with the criteria shown in FIG. 22 and generates a delivery classification table shown in FIG. 23.

FIG. 23 is a diagram illustrating an exemplary configuration of a delivery classification table. The delivery classification table in FIG. 23 includes the number of uploads, the number of downloads, and an output rate for each document type and for each delivery destination in the delivery information shown in FIG. 20.

The upload number is delivery information (below called "target delivery information sets") including upload information with the value of date/time of within one hour from the present time, the delivery information including the respective classifications of the delivery destination in the value of To. In other words, it is the number of times the uploading was performed from one hour before to the present with the respective classifications of the delivery destination as the destination. The number of downloads is the number of delivery information sets including download information in which the value of delay is within 30 minutes, out of target delivery information sets. In other words, it is the number of downloads performed within 30 minutes from downloading. The output rate is a proportion of the number of downloads to the number of uploads. The output ratio is said to be a probability in which downloading is performed within 30 minutes from uploading. On the number of downloads, the condition of the value of the delay being within 30 minutes is provided for removing, from what is to be projected, a document for which a likelihood that it will not be output even after a long time has elapsed from the uploading is high. This is because, even when such a document is to be projected, the likelihood is high that the document consumes a storage capacity of an equipment unit to be downloaded to for a long time. The value of 30 minutes may be changed as needed. Moreover, in the equipment unit to be downloaded to, for example, the projection information may be removed after a certain elapsed period. Even when the projection information is removed after elapsing of a certain period, the condition that the value of delay to be within 30 minutes may be removed.

According to FIG. 23, it may be seen that the number of reports uploaded to Taro by Yoko in the past one hour is 3, out of which 2 are downloaded (printed). Therefore, the output ratio is assumed to be 67%. Step S201 in FIG. 17 is completed by generation of the delivery classification table.

Figures 24, 25:
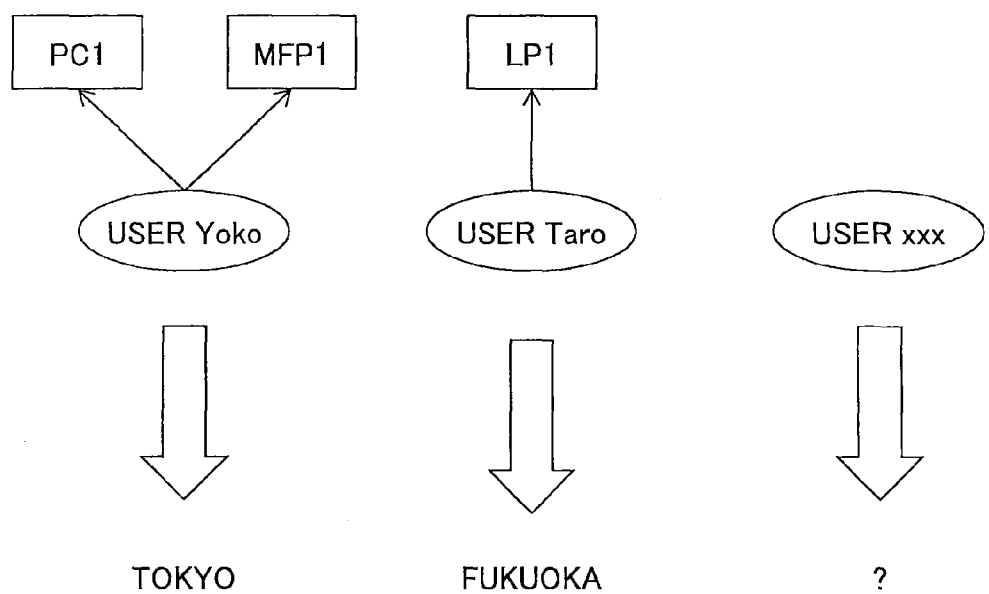
FIG. 24 is a diagram illustrating an estimated example of a current location of the respective users.
FIG. 25 is a diagram illustrating results of calculating ratios of equipment units used for output by the respective users.

Information sets shown in FIGS. 20, 23, and 25 may be generated non-synchronously with respect to the event E1. For example, the information sets shown in FIGS. 20, 23, and 25 may be generated periodically in 30 minute intervals. Steps S202 and beyond may be generated using information sets related to FIGS. 20, 23, and 25 that were last generated in response to the event E1. This makes it possible to shorten the time required to step S207 from the event E1.

Then, the projection unit 221 determines the validity of the projection process based on the output ratio of the user Taro, which is the destination of the target document, related to the document type to which the target document ("report") belongs in the delivery classification table (FIG. 23) (S202). For example, when the output ratio is at least a preset threshold, it is determined that the projection process is valid. When the threshold is 50%, the output ratio (67%) of the user Taro related to the document type ("report") to which the target document belongs is at least the threshold. Therefore, in this case, it is determined that the projection process is valid. The fact that the projection process is valid means that projection information downloaded to the image forming apparatus 10 by the projection process is likely to be actually used within a short period.

When it is determined that the projection process is not effective, or, when the applicable output ratio is less than 50%, for example, the process in FIG. 17 is completed. In this case, downloading based on the projection process is not performed. The value of 50% can be set arbitrarily. If it is determined that the projection process is effective, the projection unit 221 estimates the current location of the user of the destination of the target document (S203). The current location value of each user may be estimated based on the equipment ID in the historical information within the determined time (for example, 30 minutes) from the present time, for example. The installed location of the equipment unit related to the equipment ID may be specified based on the equipment information storage unit 232 (FIG. 19).

For example, according to the historical information shown in FIG. 18, the current location of each user is estimated as shown in FIG. 24. FIG. 24 is a diagram illustrating an estimated example of a current location of each user.

Based on the historical information within the last 30 minutes, the user Yoko uses PC1 and MFP1. According to the historical information, the location of the PC1 is Tokyo. Moreover, the location of the MFP1 is also Tokyo. Therefore, the current location of the user Yoko is estimated to be Tokyo. Based on the historical information within the last 30 minutes, the user Taro uses LP1. According to the historical information, the location of the LP1 is Fukuoka. Therefore, the current location of the user Taro is estimated to be Fukuoka. On the other hand, there is no historical information on the user xxx in the historical information within the last 30 minutes. Therefore, the current location of the user xxx is estimated to be unknown.

The current location of the respective users may be estimated based on the last historical information of the respective users. In this case, restrictions on the date/time of the historical information do not have to be set. For example, as for the user xxx, when the historical information few days ago is the last historical information, the current location of the user xxx may be estimated based on the above-mentioned historical information. The current location of the respective users may be specified in cooperation with a different computer system such as a work management system.

While a current location for the respective users is estimated for the sake of convenience in FIG. 24, the current location may be estimated for only the user Taro, which is the destination of the target document.

When the current location is unknown for the user of the destination of the target document, the process of FIG. 17 completed. When the current location could be estimated for the destination user of the target document, the projection unit 221 projects the equipment unit used by the destination user (S204). The projection of the equipment unit used is performed based on the delivery information including download information in which the delay is within 30 minutes. More specifically, the ratio (or the proportion) of the machinery body ID corresponding to the user ID related to the destination user is calculated in the download information. The download information is used because it is desired that the equipment unit to be downloaded be projected. The example in FIG. 20 causes such results as in FIG. 25 to be obtained.

FIG. 25 is a diagram illustrating results of calculating ratios of equipment units used for output by the respective users. According to the equipment use ratio table shown in FIG. 25, for the user Yoko, the ratio of using MFP1 for downloading is 100%. For the user Taro, the ratio of using the LP1 for download is 100%. For the user xxx, the ratio of using the LP1 for download is 100%. While a ratio for the respective users is calculated for the sake of convenience in FIG. 25, the ratio may be calculated for only the user Taro, which is the destination of the target document. Moreover, while simple calculation results are obtained according to the embodiment of the present invention for the sake of explanations, in the environment in which a large number of equipment units are used, the document may be downloaded using multiple equipment units by the same user.

Here, if, for the destination user of the target document, the installation location of the equipment unit with the highest ratio matches the current location which is estimated for the user, it is determined that the projection of the equipment unit used by the user succeeded. On the other hand, if, for the above-mentioned user, the installation location of the equipment unit with the highest ratio matches the current location which is estimated for the user, it is determined that projection of the equipment unit used by the user failed. According to the embodiment of the present invention, the equipment unit used by the user Taro is projected to be LP1. Out of the equipment units up to the Nth, multiple equipment units whose installation location matches the current location estimated for the destination user may be projected as the equipment units used by the user.

A case in which the projection fails includes a case in which, for example, the location of the historical information is specified with the granularity of the range moveable in a short time by the user, such as a pillar number unit, etc., and the current location of the user is estimated based on the last historical information. In this case, if the location of the equipment unit with the highest use ratio for the user differs from the current location estimated, the projection of the equipment unit used by the user fails.

The equipment unit used by the user may be projected without taking into account the current location of the user. For example, in the delivery information including download information in which the delay is within 30 minutes, the equipment unit with the highest use ratio for the user may be projected to be the equipment used by the user. Moreover, without taking into account the use ratio, it may be estimated that multiple equipment units be equipment units used by the user.

Moreover, based on the current location estimated for the user, the equipment unit used by the user may be projected. For example, when the current location of the user is estimated to be Tokyo, all equipment units whose installation location is Tokyo in the equipment information storage unit 232 or an equipment unit with a use performance by the user out of the equipment units may be projected to be equipment units used by the user. Moreover, the equipment unit used by the user may be projected by other methods.

If the projection of the equipment unit used by the destination user of the target document fails, the process in FIG. 17 is completed. If the projection of the equipment unit used by the destination user of the target document succeeds, the script generation unit 222 generates a download script for the user (S205). The download script is generated based on the download script template which is stored in the script template storage unit 237.

FIG. 26 is a diagram illustrating an exemplary configuration of a script template storage unit. In FIG. 26, the script template storage unit 237 stores the download script template in correspondence with the application ID. In FIG. 26, the download script template of "ForIn (Document: <user ID>)" is associated with the application ID ("Pullprint") of the cloud pull print. Moreover, the download script template of "In (Document: <user ID>)" is associated with the application ID ("Portal") of the device portal.

"ForIn (Document: <user ID>) indicates an instruction to "obtain a list of documents with <user ID> as the destination from the document information storage unit 235".

"In (Document: <user ID>) indicates an instruction to "check presence/absence of a document with <user ID> as the destination in the document information storage unit 235".

In the respective download script templates, "document" of a first argument is identification information for the document information storage unit 235. Therefore, if it is desired to set the information of a different storage unit to be a target, identification information of the different storage unit may be specified as a first argument. Moreover, <user ID> of a second argument is replaced with a user ID of a user to which is applied the download script based on the download script template. Which download script is applied to a user is determined based on a priority setting application of the user. For example, the application ID of the priority setting application of the user Taro is specified to be "PullPrint" based on the bookmark storage unit 236 (FIG. 14). Therefore, the script generation unit 222 generates a download script of "ForIn (Document: Taro)" for the user Taro. If the application ID of the priority setting application of the user Taro is "Portal", the script generation unit 222 generates the download script of "In (Document: Taro)".

Next, the script transmission unit 223 transmits the respective download scripts generated to an equipment unit projected to be used by the destination user of the target document (S206). The download script related to the user Taro is transmitted to the image forming apparatus 10 whose machinery body ID is "LP1".

The download script is received by the script reception unit 126 of the image forming apparatus 10 to which it is transmitted. The script execution unit 127 of the image forming apparatus 10 in which the download script is received executes downloading of projection information based on the download script (S207). More specifically, the script execution unit 127 of the image forming apparatus 10 which received "ForIn (Document: Taro)" transmits, to the service provisioning apparatus 20, a request for obtaining the document list in which the value of the destination is "Taro". In response to the obtaining request, the document list transmission unit 214 of the service provisioning apparatus 20 obtains the document in which the value of the destination is "Taro" from the document information storage unit 235. The document list transmission unit 214 returns the document list obtained. The script execution unit 127 of the image forming apparatus 10 stores, in the projectioning information storage unit 131, the document list in association with the user ID "Taro". All pages or a part of pages from the start, such as the first page of the data file of the respective documents included in the document list may be downloaded with the download list. When some of pages from the start are downloaded, the remaining pages may be obtained in parallel with printing of some of the pages of the document to be printed. In this way, the start period of the print job may be brought forward and the required time for the print job may be shortened.

If "In (Document: Taro)" is received by the script reception unit 126, the script execution unit 127 transmits, to the service provisioning apparatus 20, a request for checking the presence and absence of the document in which the value of the destination is "Taro". In response to the checking request, the document checking unit 215 of the service provisioning apparatus 20 checks whether the document in which the value of the destination is "Taro" is stored in the document information storage unit 235. The document checking unit 215 returns information indicating the presence/absence of the document applicable. The script execution unit 127 of the image forming apparatus 10 stores, in the projection information 131, the information in association with the user ID "Taro".

Moreover, if the destination of the target document indicate multiple users (including a case in which a department is specified), step S202 and beyond may be executed for each user. In this case, a situation may occur such that, while downloading is performed based on the projection process for some users, downloading based on the projection process is not performed for other users.

In the projection information storage unit 131, when the projection information obtained by executing the same download script is stored, old information may be overwritten by the new information. For example, if the uploading of the document with the user Taro as the destination is performed in intervals of around a few minutes, the same download script may be transmitted in intervals of around a few minutes to the same image forming apparatus 10. In this way, while the document list, etc., are obtained multiple times in the image forming apparatus 10, the old document list may be overwritten with the newly obtained document list in the image forming apparatus 10.

If the image forming apparatus 10 which receives the download script is used by either of the users, or, in other words, when any of the users is logged in, the script execution unit 127 of the image forming apparatus 10 may start execution of the download script after the user logs out. This makes it possible to avoid the load due to execution of the download script influencing an operation of the image forming apparatus 10 by the user.

Moreover, the service provisioning apparatus 20 may grasp the log-in state of the respective image forming apparatuses 10 based on the historical information. Based on the grasping of the log-in state of the respective image forming apparatuses 10, the script transmission unit 223 may adjust the timing of transmission of the download script. For example, the script transmission unit 223 may transmit the download script to the image forming apparatus after the log out is reported from the image forming apparatus 10 to which the download script is transmitted.

Moreover, in step S206, the script transmission unit 223 may transmit results of executing the download script in the service provisioning apparatus 20 instead of the download script. For example, for "ForIn(Document: Taro)", the document list and the user ID ("Taro") may be transmitted.

Moreover, not only the document list and the presence/absence of the document, but also the list of the job information on the document, and application specific information on the priority setting application may be transmitted in step S206 together with the download script. The application specific information means specific information for each application. One example of the application specific information includes setting information on the application. For example, for the cloud pull print, setting information on printing may be the application specific information. For the different application specific information for each user, the application specific information may be stored for each user ID and for each application ID in the bookmark storage unit 236. The application specific information common to multiple users may be stored for each application in the application information storage unit 233, for example.

When the number of applications is numerous, storing application specific information in advance on the image forming apparatus 10 is a waste of storage capacity. The application specific information as well as projection information for each user may be subjected to the projection process, so that, even for the application specific information, the same advantageous effects as obtained in the projection process in the projection information of the user may be obtained.

Moreover, when a firewall is installed on the tenant side and information may not be PUSHED to the image forming apparatus 10 from the service provisioning apparatus 20, step S206 may be executed in response to any request, report, etc., from the image forming apparatus 10. For example, the script reception unit 126 of the image forming apparatus 10 may periodically inquire presence/absence of the download script to the service provision apparatus 20.

Moreover, if a specific equipment unit is specified as a destination by a certain user, or, in other words, if the user uploads a document with a specific equipment unit as a destination for the purpose of the user himself downloading it, the process by the projection unit 221 that is described in FIG. 17 may be simplified. In this case, the user which executes downloading and the equipment unit to be downloaded are specified. Therefore, without steps S201-S204 being executed, the projection script related to the user may be generated for the equipment unit. Alternatively, inclusion of a predetermined keyword such as "emergency", etc., for example, in the name of a document, or as a parameter of uploading may be set to be a condition in which the projection process is executed in this case.

Next, a process is described which is executed in response to returning from a saving energy state of the image forming apparatus 10 which detected the smart card. The process also includes the projection process executed in a period B in FIG. 6.

Figure 27:
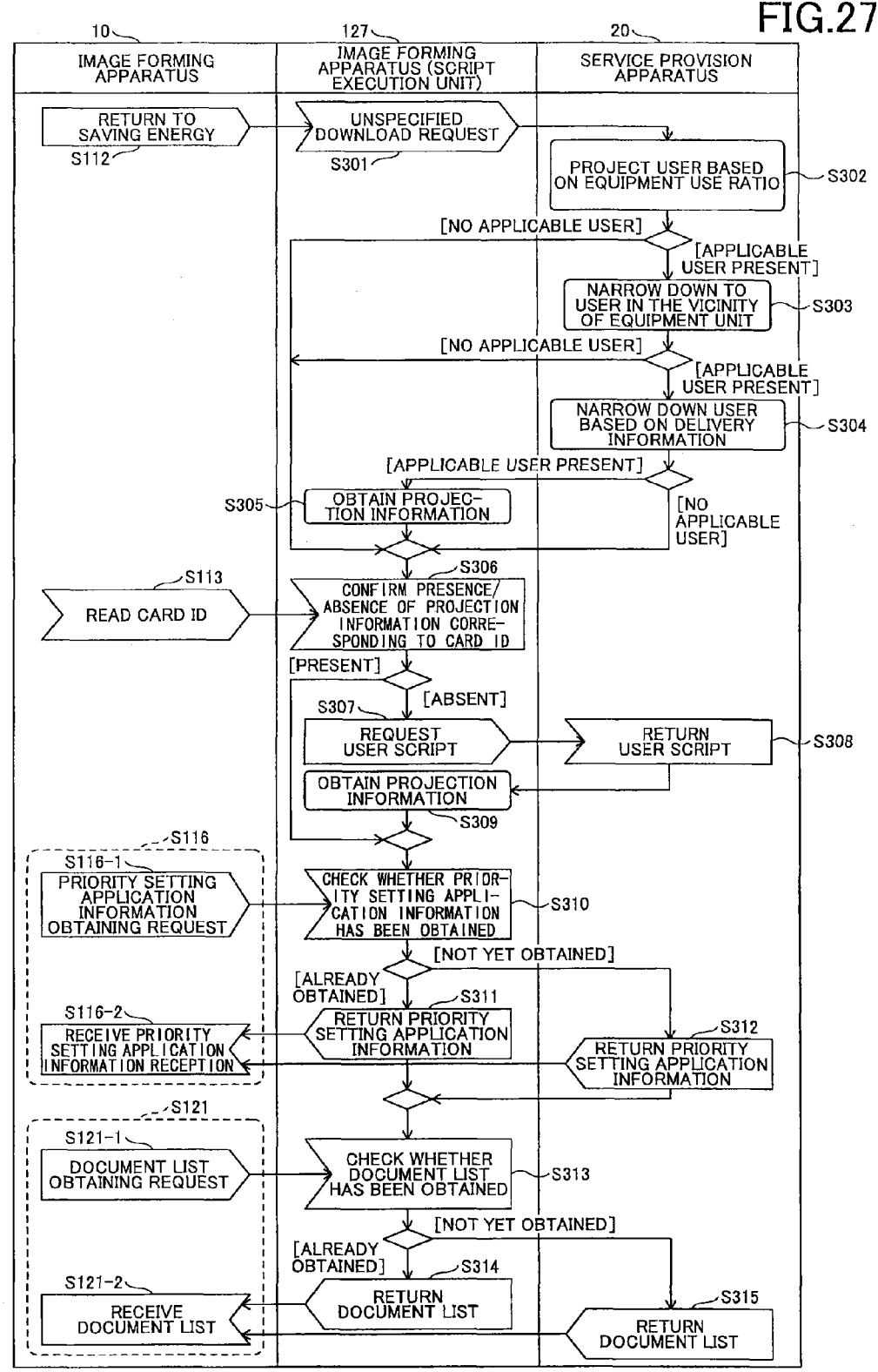
FIG. 27 is a diagram for explaining one example of a processing procedure executed in response to returning from a state of saving energy of the image forming apparatus.

FIG. 27 is a diagram for explaining one example of a processing procedure executed in response to returning from the saving energy state of the image forming apparatus. In FIG. 27, the same letter is given to the steps which are identical to or corresponds with that in FIG. 10.

When the image forming apparatus 10 (below called "target equipment unit") over which a smart card is held returns from the saving energy state (S112), the script execution unit 127 of the target equipment unit transmits the download request to the service provisioning apparatus 20 (S301). At this time, the image forming apparatus 10 used is specified, but the user is not specified. Therefore, the download request includes therein the machinery body ID of the target equipment, but not the user ID.

In response to the download request, the projection unit 221 of the service provisioning apparatus 20 projects the user of the target equipment unit based on the equipment use ratio table shown in FIG. 25 (S302). For example, the user related to a user ID which has a ratio which exceeds 0% relative to the machinery body ID included in the download request is projected to be the user of the target equipment unit. When the machinery unit ID included in the download request is "LP1", "Taro" is projected to be the user of the target equipment unit based on the equipment use ratio table in FIG. 25. The equipment use ratio table may be generated in step S302, or what is generated in advance, or, for example, what is generated in step S201 in FIG. 17 may be used.

When there is no applicable user ID, downloading at this time is given up, proceeding to step S306. When there is at least one applicable user ID (below called "projection user ID group"), step S303 is executed in order to increase the projection accuracy by further narrowing down the projection user ID group. When there is at least one user ID included in the projection user ID group, the process may proceed to step S305.

In step S303, out of the respective user IDs included in the projection user ID group, the projection unit 221 extracts the user ID related to the user using the target equipment unit in the historical information (FIG. 18) within the past 30 minutes, for example. In other words, the user ID of the user which is projected to be present in the vicinity of the target equipment is extracted.

When there is no applicable user ID extracted, downloading at this time is given up, proceeding to step S306. When there is at least one user ID extracted, step S304 is executed to increase the projection accuracy by further narrowing down the projection user ID group. Below, the user ID extracted in step S303 is called the projection user ID group. At this time, when there is one user ID included in the projection user ID group, the process may proceed to step S305.

In step S304, the projection unit 221 extracts the user ID related to the destination of the document not downloaded based on the delivery information shown in FIG. 20 from the projection user ID group. The document not downloaded applies to a document without download information in the delivery information.

When there is no applicable user ID extracted, downloading at this time is given up, proceeding to step S306. When there is a user ID extracted, the script generation unit 222 generates a download script related to the user. The script transmission unit 223 transmits the download script generated to the target equipment unit. In step S304, multiple user IDs may be extracted. In this case, the download script related to multiple users may be transmitted to the target equipment unit.

Moreover, any two or any one of steps S302, S303, and S304 may be executed.

When the download script is received, the script execution unit 127 of the target equipment unit obtains projection information from the service provisioning apparatus 20 based on the download script (S305). The script execution unit 127 stores the obtained projection information to the projection information storage unit 131 in association with the user ID included in the download script.

Up to step S305 is a projection process, in a state in which the user is not specified, that is executed during the returning from the energy saving state. The projection of the user may be performed in the target equipment unit. For example, based on log information stored in the target equipment unit, the user whose use frequency is at a high level may be projected as a user at this time. In this case, in the download request in step S301, the user ID may be included in addition to the equipment ID of the target equipment unit. With the user ID as the population, steps S302-S304 may be executed, or step S305 may be executed without executing step S302 and beyond.

Then, when the card ID is read from the smart card (S113), the script execution unit 127 determines presence/absence of projection information for the user related to the card ID (S306), out of projection information stored in the projection information storage unit 131 in step S305. Along with the download script, the card ID which corresponds to the user ID included in the download script may be received. In this way, the user ID and the card ID may be associated with the respective projection information sets and determination of the presence/absence of the projection information associated with the card ID read in step S113 may be sped up. Alternatively, if association information between the user ID and the card ID in the target equipment unit is cached within the target equipment unit, the user ID which corresponds to the card ID read may be specified based on the associated information.

When there is projection information for the user (below called "target user") related to the card ID, the process proceeds to step S310. When there is no projection information for the target user, the script execution unit 127 transmits the request for obtaining the download script including the card ID to the service provisioning apparatus (S308). With reference to the user information storage unit 231 (FIG. 11), the script generation unit 222 of the service provisioning apparatus 20 specifies the user ID corresponding to the card ID included in the obtaining request. Moreover, the script generation unit 222 specifies the application ID of the priority setting application of the user with reference to the bookmark storage unit 236 (FIG. 14). The script generation unit 222 applies the user ID to the download script template stored in the script template storage unit (FIG. 26) in association with the application ID to generate the download script. The script transmission unit 223 transmits the download script to the target equipment (S308).

When the download script is received, the script execution unit 127 of the target equipment unit obtains projection information from the service provisioning apparatus 20 based on the download script (S309). The script execution unit 127 stores the obtained projection information to the projection information storage unit 131 in association with the user ID included in the download script.

Next, in the process (S116) of obtaining the priority setting application information in FIG. 10, the application management unit 123 of the target equipment requires obtaining the priority setting application information for the script execution unit 127 (S116-1). The request includes therein an application ID of the priority setting application. The script execution unit 127 checks whether application information corresponding to the application ID is stored in the projection information storage unit 131 (S311). When application information is stored in the projection information storage unit 131 is stored, the script execution unit 127 returns the application information to the application management unit 123 (S311). When the application information is not stored in the projection information storage unit 131, the script execution unit 127 transmits the request for obtaining the application information to the service provisioning apparatus 20. In the obtaining request is included an application ID specified in step S116-1. The application information management unit 218 of the service provisioning apparatus 20 obtains the application information related to the application ID from the application information storage unit 233 (FIG. 15) and returns the application information (S312). When the application information is received, the script execution unit 127 stores the application information to the projection information storage unit 131 and returns the application information to the application management unit 123. The application management unit 123 receives application information returned from the script execution unit (S116-2).

While the priority setting application information is not subjected to downloading in the projection process according to the present embodiment, the priority setting application information may also be transmitted by the script transmission unit 223 along with the download script.

Next, in the document list obtaining process in FIG. 10, the browser unit 124 requests for obtaining a document list to the script execution unit 127 (S121-1). The request includes therein a user ID of a user logging into the target equipment. The script execution unit 127 checks whether a document list associated with the user ID is stored in the projection information storage unit 131 (S313).

When the applicable document list is stored in the projection information storage unit 131, the script execution unit 127 returns the document list to the browser unit 124 (S314). When the applicable document list is not stored in the projection information storage unit 131, the script execution unit 127 transmits the request for obtaining the document list to the service provisioning apparatus 20. In the obtaining request is included a user ID specified in step S121-1. The document list transmission unit 214 of the service provision unit 20 obtains a document list which includes the user ID in the destination from the document information storage unit 235 (FIG. 13) and returns the document list (S315). When the document list is received, the script execution unit 127 returns it to the browser unit 124. The browser unit 124 receives a document list returned from the script execution unit (S121-2).

While a case is described in the above of the priority setting application of the login user for the image forming apparatus 10 being a cloud pull print, when the priority setting application of the log-in user is a device portal, for example, in S117 in FIG. 10 activation of the device portal is required and in step S118 the device portal is activated. According to FIG. 15, as the device portal is an application installed in advance, steps S119 and S120 are not executed. Moreover, in step S121, the process of obtaining information indicating presence/absence of the document related to the login user is executed. In the obtaining process, information indicating presence/absence of the document is obtained from the projection information storage unit 131 or the service provisioning apparatus 20. In other words, when the download script of "In (Document: <user ID of login user>" is executed, the information is obtained from the projection information storage unit 131. In step S122, the portal screen, which is the operation screen of the device portal, is displayed.

Figure 28:
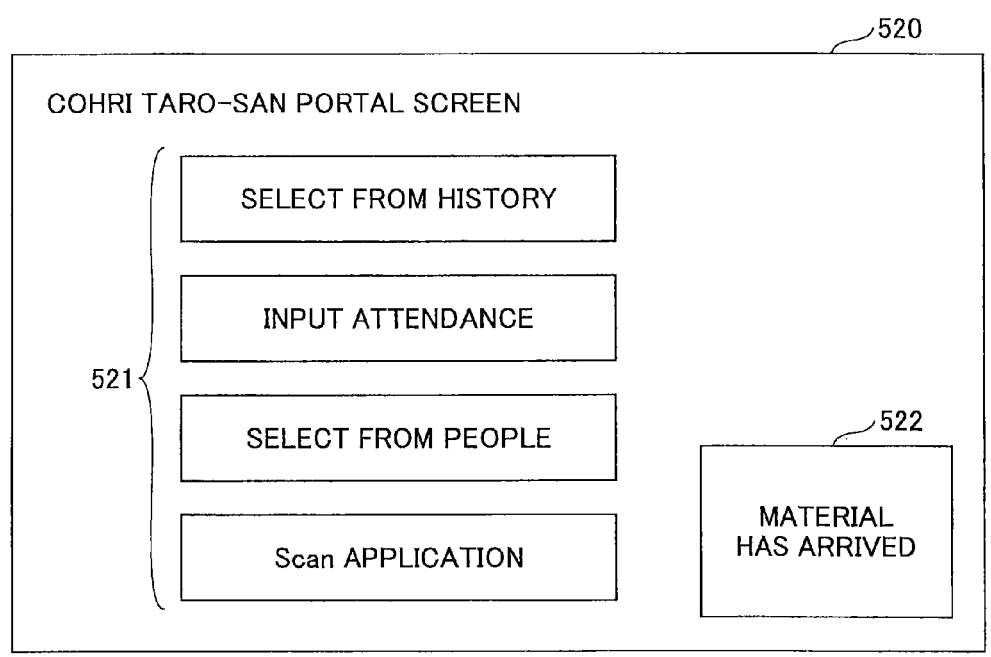
FIG. 28 is a diagram illustrating exemplary displaying of a portal screen.

FIG. 28 is a diagram for illustrating exemplary displaying of a portal screen. In FIG. 28, the portal screen 520 includes an operation menu 521, a button 522, etc. The operation menu 521 includes a button for accepting an instruction for launching an application associated with an operation. The button 522 is a button for accepting a display request (a request for activating a cloud pull printing) of a document list screen 510 (FIG. 16). In FIG. 28, a message indicating that a material has arrived is displayed in the button 512. This is displayed based on information indicating presence/absence of the document that is downloaded based on a download script for the device portal application.

As described above, according to the present embodiment, an equipment unit to be used or a user using the equipment unit is projected based on some event such as uploading of the document, returning from the saving energy state, etc. Based on the projection, the individual information of the user that is related to the application used by the user is transmitted to the equipment unit. In other words, information which is likely to be used by the user before the user starts use of the application is transmitted to the equipment unit. Therefore, the embodiment of the present invention makes it possible to improve the operability of individual information for each user which is managed via a network.

Uploading of the document to the service provisioning apparatus 20 may be performed by an equipment unit other than the PC 50. For example, the image data scanned in the image forming apparatus 10 may be uploaded by the image forming apparatus 10. Moreover, the equipment unit to which the document is downloaded may not be limited to the image forming apparatus 10. For example, the projector 30 may be the download destination or a different equipment unit may be the download destination.

In summary, when the individual information is stored in a storage apparatus such as a cloud storage that is connected to an equipment unit via a network, the operability of the equipment unit is greatly influenced by the responsiveness of network communications. For example, display time of the screen may be prolonged, possibly giving stress to the user. To avoid such a situation, it is possible to download in advance the individual information of the user to the equipment unit.

However, in an equipment unit which is shared by dozens of users, for example, in order to download individual information sets for all of the users in advance, it is necessary for the equipment unit to include a storage apparatus having a storage capacity which is sufficient to store these individual information sets. An increased size of the storage apparatus leads to an increased cost of the equipment unit. More specifically, it is not economical for the storage capacity to be used in large quantities by the individual information sets which are not known with respect to when they are used.

The embodiments of the present invention have been described in view of the problems as described above, for an object to improve the operability of individual information for each user which is managed via a network.

As described above, for an image forming apparatus, if a list of print data which is saved in association with a user is included in a screen displayed in response to a login of the user, for example, the number of operational steps needed until outputting the printing data may be reduced. The reduction in the number of operational steps makes it possible to improve the convenience of the equipment units. In other words, the embodiment of the present invention makes it possible to improve the operability of individual information for each user which is managed via a network.

While the embodiments of the present invention have been described in detail. However, the present invention is not limited to such specific embodiment, so that variations and modifications are possible within the scope of the gist of the present invention that are recited in the claims.

As described above, for an image forming apparatus, if a list of print data which is saved in association with a user is included in a screen displayed in response to a login of the user, for example, the number of operational steps needed until outputting the printing data may be reduced. The reduction in the number of operational steps makes it possible to improve the convenience of the equipment units. In other words, the embodiment of the present invention makes it possible to improve the operability of individual information for each user which is managed via a network.

The present application is based on and claims the benefit of priority of Japanese Priority Application No. 2014-051848 filed on Mar. 14, 2014, the entire contents of which is hereby incorporated by reference.

The invention claimed is:
1. An information processing system including at least one computer that is connected to a first equipment via a network, the information processing system comprising:
a receiver configured to receive data via the network;
a memory configured to store the data;
a first transmitter configured to transmit, to the first equipment, the data in response to a request for obtaining the data stored in the memory from at least one other equipment;
a historical information memory configured to store historical information corresponding to transmission of the data by the first transmitter and reception of the data by the receiver;
a projection circuit configured to project the first equipment which transmits the obtaining request corresponding to first data in response to the reception of the first data by the receiver; and
a second transmitter configured to transmit information corresponding to the first data to the first equipment, wherein the projection circuit is further configured to identify predetermined data corresponding to the historical information, the historical information being necessary for a process, and transmit the identified predetermined data before a future request for obtaining the data to the first equipment.

2. The information processing system as claimed in claim 1, wherein the receiver receives data and identification information on a destination of the data, wherein:

the memory is further configured to store the data received in association with information corresponding to a transmission source of the data and the identification information corresponding to the destination of the data, the historical information corresponding to reception of data includes identification information corresponding to the data; identification information corresponding to the transmission source of the data; and identification information corresponding to the destination of the data, the historical information corresponding to the transmission of the data by the first transmitter includes the identification information corresponding to the data; the identification information corresponding to a user related to the obtaining request and the identification information corresponding to the first equipment related to the obtaining request, and the projection circuit is further configured to project the first equipment which transmits the obtaining request corresponding to the first data based on the information related to the transmission source of the first data, the identification information corresponding to the destination of the first data and the historical information.

3. The information processing system as claimed in claim 2, wherein the first transmitter transmits data specified in the obtaining request out of data stored in the memory in association with identification information corresponding to the user related to the obtaining request as identification information corresponding to the destination.

4. The information processing apparatus as claimed in claim 2, wherein the second transmitter transmits information corresponding to data stored in the memory in association with identification information corresponding to the destination of the first data.

5. The information processing apparatus as claimed in claim 2, wherein the historical information includes information indicating a time at which the data was received by the receiver, or a time at which the data was transmitted by the first transmitter, and wherein the projection circuit is further configured to project the first transmitter when a percentage of the number of the first historical information is at least a second threshold for the number of a second historical information that has a difference within a first threshold with first historical information corresponding to the reception that includes identification information corresponding to the same data as the historical information out of the historical information corresponding to the transmission that includes identification information corresponding to the destination of the first data as identification information of the user related to the obtaining request.

6. The information processing system as claimed in claim 1, further comprising a third transmitter which transmits, to the first equipment, an instruction which causes the first equipment to execute obtaining of information corresponding to the first data to the first equipment, and wherein the first transmitter transmits, to the first equipment, information corresponding to the first data, in response to a request transmitted by the first equipment based on an instruction transmitted by the third transmitter.

7. The information processing apparatus as claimed in claim 1, wherein the computer is configured to retrieve historical information corresponding to the user during an authentication period of the user credentials.

8. An equipment connected via a network to an information processing system including a computer, comprising:

a receiver configured to receive identification information corresponding to a user and predetermined information stored in the information processing system corresponding to the user from the information processing system;

a memory configured to store identification information corresponding to the user received by the receiver and predetermined information; and a display control circuit configured to display, on a display circuit, the predetermined information stored in the memory in association with identification information corresponding to the user in response to the identification information corresponding to the user, wherein the receiver is further configured to receive, from the information processing system, the predetermined information before a future request for obtaining the identification information and the predetermined information.

9. The equipment as claimed in claim 8, wherein the receiver is further configured to transmit a predetermined request to the information processing system in response to starting of an input of the identification information on the user and receives information transmitted from the information processing system in response to the predetermined request.

10. An information processing method, comprising executing, by an equipment connected via a network to an information processing system including a computer, the steps of:

receiving identification information corresponding to a user and predetermined information stored in the information processing system on the user from the information processing system;

storing, in association in a memory, the predetermined information and the identification information on the user that are received by the receiving step; and displaying, in a display circuit, the predetermined information stored in the memory in association with the identification information on the user in response to inputting of the identification information on the user, wherein the identification information corresponding to a user and the predetermined information are received before a future request for obtaining the identification information and the predetermined information.

11. The information processing method as claimed in claim 10, wherein the step of receiving includes transmitting a predetermined request to the information processing system in response to a start input of the identification information on the user and receives information transmitted from the information processing system in response to the predetermined request.

* * * * *